US011391291B2

(12) United States Patent
Groshek et al.

(10) Patent No.: US 11,391,291 B2
(45) Date of Patent: Jul. 19, 2022

(54) FOIL BEARING ASSEMBLY

(71) Applicant: Emerson Climate Technologies, Inc., Sidney, OH (US)

(72) Inventors: Jacob A. Groshek, Avon, OH (US); Michael M. Perevozchikov, Tipp City, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 337 days.

(21) Appl. No.: 16/783,369

(22) Filed: Feb. 6, 2020

(65) Prior Publication Data

US 2020/0256347 A1 Aug. 13, 2020

Related U.S. Application Data

(60) Provisional application No. 62/802,506, filed on Feb. 7, 2019.

(51) Int. Cl.
*F04D 29/057* (2006.01)
*F04D 17/10* (2006.01)
(Continued)

(52) U.S. Cl.
CPC ......... *F04D 29/057* (2013.01); *F04D 17/105* (2013.01); *F16C 17/024* (2013.01);
(Continued)

(58) Field of Classification Search
CPC .... F04D 29/057; F16C 17/024; F16C 17/243; F05B 2240/53
See application file for complete search history.

(56) References Cited

U.S. PATENT DOCUMENTS 4,195,395 A 4/1980 Silver et al.
4,701,060 A 10/1987 Gu
(Continued)

FOREIGN PATENT DOCUMENTS

CN 203879943 U 10/2014
DE 102014018070 A1 7/2015
(Continued)

OTHER PUBLICATIONS

English translation of JP62-52216 (Year: 1987).*
International Search Report and Written Opinion for PCT/US2020/017026 dated May 19, 2020, 13 pages.

*Primary Examiner* — Eldon T Brockman
*Assistant Examiner* — Brian O Peters
(74) *Attorney, Agent, or Firm* — Armstrong Teasdale LLP

(57) ABSTRACT

A foil bearing assembly includes a cylindrical body that defines a cooling fluid passage between a radial outer surface and a radial inner surface of the cylindrical body. The foil bearing assembly includes a foil bearing retained within the cylindrical body and in thermal communication with the radial inner surface of the cylindrical body. The foil bearing assembly is connectable to a bearing housing such that intake and outlet ports of the foil bearing assembly are connected in fluid communication with a coolant inlet passage and a coolant outlet passage defined by the bearing housing. The foil bearing assembly is interchangeable with a second foil bearing assembly having at least one of a cooling fluid passage, a foil bearing, and a cylindrical body inner diameter different than the corresponding cooling fluid passage, the foil bearing, and the cylindrical body inner diameter of the first foil bearing assembly.

20 Claims, 26 Drawing Sheets

216
210
200
212
312
314
320
104
316
214

(51) Int. Cl.

| | |
|---|---|
| ***F16C 17/02*** | (2006.01) |
| ***F16C 17/24*** | (2006.01) |
| ***F16C 43/02*** | (2006.01) |

(52) U.S. Cl.

CPC ........ *F16C 17/243* (2013.01); *F05B 2240/53* (2013.01); *F16C 43/02* (2013.01); *F16C 2360/44* (2013.01)

(56) References Cited

U.S. PATENT DOCUMENTS

| | | | | |
|---|---|---|---|---|
| 4,818,123 | A | 4/1989 | Gu | |
| 7,056,025 | B2 | 6/2006 | Nakata | |
| 7,108,488 | B2 | 9/2006 | Larue et al. | |
| 7,988,426 | B2 | 8/2011 | Elpern et al. | |
| 8,419,283 | B2 | 4/2013 | McAuliffe et al. | |
| 8,475,048 | B2 | 7/2013 | Kume et al. | |
| 9,322,294 | B2 * | 4/2016 | Lee | F16C 17/024 |
| 9,394,946 | B2 | 7/2016 | Rocchi et al. | |
| 2011/0243762 | A1 * | 10/2011 | Daikoku | F04D 25/0606 384/105 |
| 2015/0308456 | A1 | 10/2015 | Thompson et al. | |
| 2015/0362012 | A1 | 12/2015 | Ermilov | |

FOREIGN PATENT DOCUMENTS

| | | | | |
|---|---|---|---|---|
| EP | 3171047 | A1 | | 5/2017 |
| JP | 62-52216 | | * | 3/1987 |
| JP | 2004263781 | A | | 9/2004 |

* cited by examiner

FOIL BEARING ASSEMBLY

CROSS-REFERENCE TO RELATED APPLICATIONS

This application claims priority to U.S. Provisional Patent Application Ser. No. 62/802,506, filed on Feb. 7, 2019, the disclosure of which is hereby incorporated by reference in its entirety.

FIELD

The field of the disclosure relates generally to bearing systems, and more particularly, to foil bearing assemblies for use in compressors.

BACKGROUND

Recent CFC-free commercial refrigerant compositions, such as R134A, have lower densities compared to previously-used CFC or HCFC refrigerants such as R12. To process the higher volumes of refrigerant necessary to enable cooling performance comparable to systems using CFC or HCFC coolants, the design of a CFC-free refrigerant compressor may be modified to process refrigerant at higher operating speeds and/or operate with higher efficiency. Centrifugal compressors have numerous advantages over other positive displacement compressor designs, such as reciprocating, rotary, scroll, and screw compressors, but the incorporation of centrifugal compressors in lower-capacity cooling systems is limited due to the high rotation speed of the impeller of a centrifugal compressor and the associated challenges of providing a suitable operating environment for the impeller and associated motor.

Centrifugal compressors include compressor bearings that support the driveshaft used to power one or more compression stages. These compressor bearings are typically provided with one or more features to reduce friction between the compressor bearing and the driveshaft. Foil bearings, a type of oil-free compressor bearing, support the driveshaft on a fluid layer and are well-suited for the high-speed operating environment typical of centrifugal compressors. However, the use of foil bearings are accompanied by challenging thermal management issues resulting from a complex interaction of both internal and external factors.

The temperature of a foil bearing may be influenced by heat conduction from adjacent high temperature components, as well as heat produced internally from viscous shear occurring within the thin fluid film. Although the viscosity of fluids within foil bearings is typically low, the high surface speeds of foil bearings during operation generate heat that typically dissipates into the driveshaft and foil bearing. The dissipation of heat from the foil bearing is limited due to the relatively limited thermal path provided by the elastic elements of the bump foil positioned between the compliant top foil that contacts the thin fluid film and underlying bearing components, such as the bearing housing. Any heat that does pass through the foil bearing is modulated by thermal conduction to the surrounding bearing housing and any energy transfer that does occur at the top foil/bump foil contact points.

If the local temperatures within the foil bearing and driveshaft are not controlled, bearing performance can be detrimentally affected in a number of ways. Overheating of the bump foil material may induce softening and enhanced bearing compliance, reducing the bearing's maximum load capacity, and potentially limiting the bearing's stiffness and damping properties. In some cases, the driveshaft absorbs most of the heat during operation of the foil bearing, causing it to expand faster than the foil bearing in a self-sustaining cycle known as "thermal runaway" that can lead to failure of the foil bearing. The formation of excessive axial thermal gradients across the foil bearing's half-width (middle to the edge) may sufficiently warp the compliant top foil to the point that it interferes with the formation of a fully developed fluid-film.

Thermal management in oil-free foil bearing systems is typically enabled using cooling of the driveshaft and/or axial cooling. Although cooling of the driveshaft is typically the most effective thermal management method, driveshaft cooling is notoriously challenging to implement in many compressor systems. Axial cooling is enabled by forcing a fluid through the foil bearing's support structure (bump foils) to remove heat, but the flow rate and direction of the introduced fluid may exacerbate the development of an axial thermal gradient to the point of bearing failure or contribute to thermal runaway.

This background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a compressor system includes a compressor housing, a motor driveshaft rotatably supported within the compressor housing, an impeller connected to the driveshaft and operable to compress incoming refrigerant gas upon rotation of the driveshaft, a bearing housing mounted to the compressor housing and defining a coolant inlet passage and a coolant outlet passage, and first and second foil bearing assemblies. Each of the first and second foil bearing assemblies includes a cylindrical body and a foil bearing retained within the cylindrical body. The cylindrical body has an outer surface including a pair of opposed end surfaces and a radial outer surface defining an outer diameter of the cylindrical body. The cylindrical body further has a radial inner surface defining an inner diameter of the cylindrical body. The cylindrical body defines a cooling fluid passage between the radial outer surface and the radial inner surface, where the cooling fluid passage extends from an intake port defined in the outer surface to an outlet port defined in the outer surface. The foil bearing is in thermal communication with the radial inner surface of the cylindrical body for conductive heat transfer therebetween. Each of the first and second foil bearing assemblies is connectable to the bearing housing such that the intake and outlet ports are connected in fluid communication with the coolant inlet passage and coolant outlet passage defined by the bearing housing. The first foil bearing assembly is interchangeable with the second foil bearing assembly.

In another aspect, a foil bearing assembly includes a cylindrical body having an outer surface including a pair of opposed end surfaces and a radial outer surface defining an outer diameter of the cylindrical body. The cylindrical body further has a radial inner surface defining an inner diameter of the cylindrical body. The cylindrical body defines a cooling fluid passage between the radial outer surface and the radial inner surface, where the cooling fluid passage extends from an intake port defined in the outer surface to an outlet port defined in the outer surface. The foil bearing assembly further includes a foil bearing retained within the cylindrical body and in thermal communication with the radial inner surface of the cylindrical body for conductive heat transfer therebetween. The foil bearing assembly is connectable to a bearing housing such that the intake and outlet ports are connected in fluid communication with a coolant inlet passage and a coolant outlet passage defined by the bearing housing. The foil bearing assembly is a first foil bearing assembly and is interchangeable with a second foil bearing assembly having at least one of a cooling fluid passage, a foil bearing, and a cylindrical body inner diameter different than the corresponding cooling fluid passage, the foil bearing, and the cylindrical body inner diameter of the first foil bearing assembly.

In yet another aspect, a method of assembling a compressor system includes selecting a first foil bearing assembly from a plurality of foil bearing assemblies for connection to a bearing housing of the compressor system. Each of the plurality of foil bearing assemblies includes a cylindrical body and a foil bearing retained within the cylindrical body. The cylindrical body has an outer surface that includes a pair of opposed end surfaces and a radial outer surface defining an outer diameter of the cylindrical body. The cylindrical body further has a radial inner surface defining an inner diameter of the cylindrical body. The cylindrical body defines a cooling fluid passage between the radial outer surface and the radial inner surface, where the cooling fluid passage extends from an intake port defined in the outer surface to an outlet port defined in the outer surface. The foil bearing is in thermal communication with the radial inner surface of the cylindrical body for conductive heat transfer therebetween. Selecting the first foil bearing assembly from the plurality of foil bearing assemblies includes selecting the first foil bearing assembly based on at least one of a cooling capacity of the compressor, a driveshaft diameter, a driveshaft weight, a driveshaft operating speed, a driveshaft material, and a type of refrigerant used in the compressor. The method further includes connecting the first foil bearing assembly to the bearing housing such that the intake and outlet ports are connected in fluid communication with a coolant inlet passage and a coolant outlet passage defined by the bearing housing.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the drawings.

DETAILED DESCRIPTION

Foil bearing assemblies with foil bearings to support a driveshaft of a system including, but not limited to, a compressor system, are disclosed. The inclusion of the at least one foil bearing assembly in the system enables low friction support of the driveshaft without the use of oil-based lubricants, as described below. The foil bearing assembly includes a foil bearing retained within a cylindrical body configured to be inserted and connected to a bearing housing of the system. In some aspects, the foil bearing assemblies are configured to be removably connected to the bearing housing. In some aspects, the cylindrical bodies of a group of foil bearing assemblies are provided with essentially identical outer dimensions so that each foil bearing assembly is interchangeable with any other foil bearing assembly within the group. In addition, an intake port and an outlet port are defined in the outer surface of each cylindrical body of the group with essentially identical positions and dimensions such that each foil bearing assembly of the group is configured to interchangeably fluidly connect to a coolant inlet passage and a coolant outlet passage defined by the bearing housing to enable active cooling of the cylindrical body and foil bearing of the foil bearing assembly.

Although the outer dimensions of the cylindrical bodies of a group of foil bearing assemblies may be essentially identical, various aspects of various elements positioned within each cylindrical body may differ within a group of foil bearing assemblies including, but not limited to, design, materials and dimensions of the foil bearings, as well as the profile and capacity of cooling elements, such as a cooling fluid passage extending from the intake port and the outlet port of the cylindrical body. The group of interchangeable foil bearing assemblies with a variety of different internal configurations enables potentially extensive reconfigurations of the bearings supporting a driveshaft of a system by the relatively simple exchange of one interchangeable foil bearing assembly with another foil bearing assembly with the desired configuration.

Figure 1:
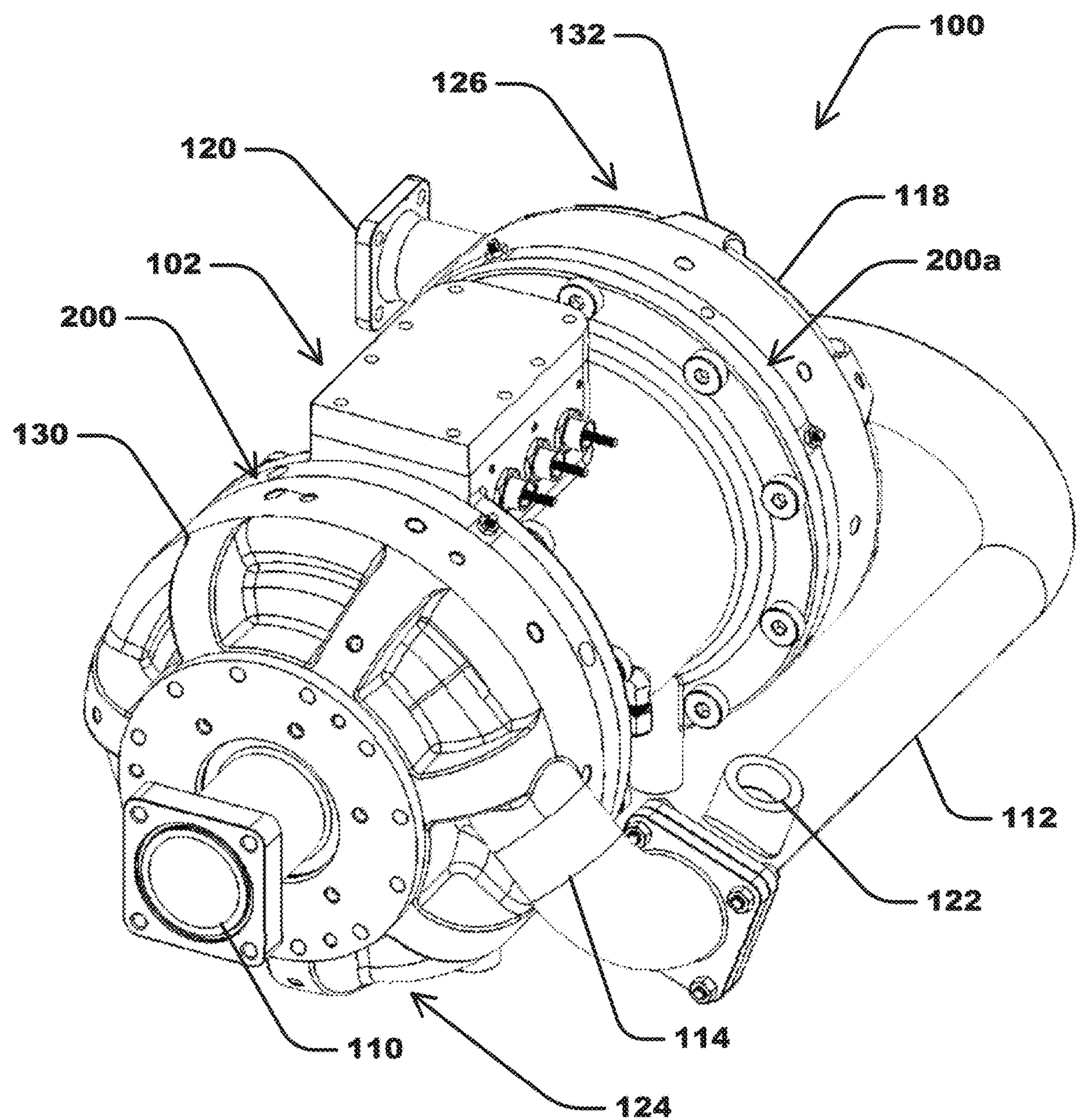
FIG. 1 is a perspective view of a compressor system.

The foil bearing assemblies are incorporated into the design of any type of centrifugal compressor without limitation. Non-limiting examples of centrifugal compressors suitable for use with the disclosed bearing system include single-stage, two-stage, and multi-stage centrifugal compressors. Referring to FIG. 1, a compressor illustrated in the form of a two-stage coolant compressor is indicated generally at 100. Compressor system 100 generally includes a compressor housing 102 forming at least one sealed cavity within which each stage of refrigerant compression is accomplished. Compressor system 100 includes a first refrigerant inlet 110 to introduce refrigerant vapor into the first compression stage 124, a first refrigerant exit 114, a refrigerant transfer conduit 112 to transfer compressed refrigerant from the first compression stage to the second compression stage, a second refrigerant inlet 118 to introduce refrigerant vapor into the second compression stage 126, and a second refrigerant exit 120. The refrigerant transfer conduit 112 is operatively connected at opposite ends to the first refrigerant exit 114 and the second refrigerant inlet 118, respectively. The second refrigerant exit 120 delivers compressed refrigerant from the second compression stage to a cooling system in which compressor system 100 is incorporated. The refrigerant transfer conduit 112 may further include a refrigerant bleed 122 to add or remove coolant as needed at the compressor system 100.

Figure 2:
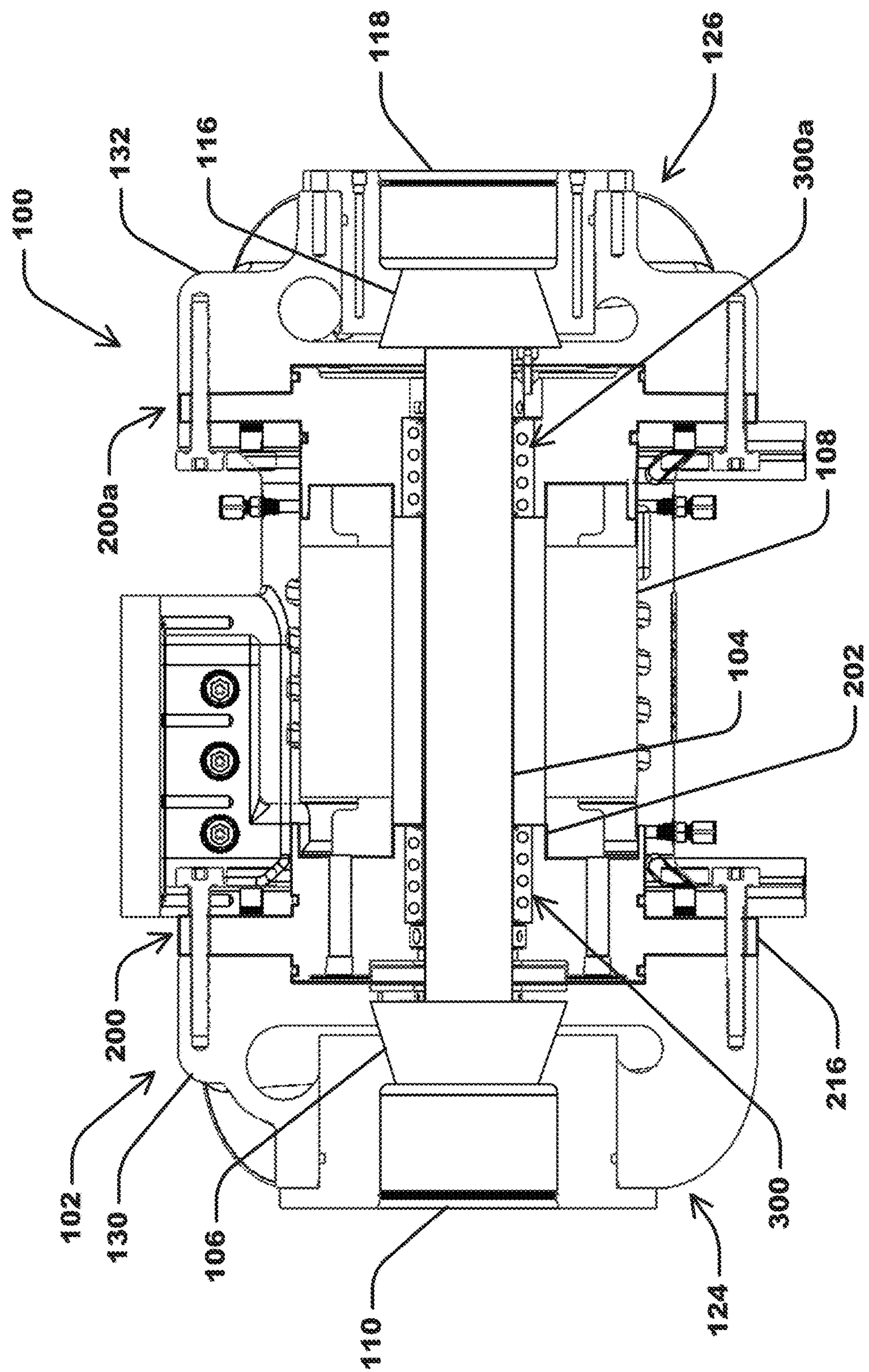
FIG. 2 is a cross-sectional view of the compressor system of FIG. 1 with the external conduit removed.

Referring to FIG. 2, the compressor housing 102 includes a first housing end portion 130 enclosing a first compression stage 124 and a second housing end portion 132 enclosing a second compression stage 126. The first compression stage 124 and the second compression stage 126 are positioned at opposite ends of the compressor system 100, but can also be located at the same end of the compressor system 100. The first compression stage 124 includes a first impeller 106 configured to add kinetic energy to refrigerant entering via the first refrigerant inlet 110. The kinetic energy imparted to the refrigerant by the first impeller 106 is converted to increased refrigerant pressure (i.e., compression) as the refrigerant velocity is slowed upon transfer to a sealed cavity formed between a first bearing housing 200 and the first housing end portion 130. Similarly, the second compression stage 126 includes a second impeller 116 configured to add kinetic energy to refrigerant transferred from the first compression stage 124 entering via the second refrigerant inlet 118. The kinetic energy imparted to the refrigerant by the second impeller 116 is converted to increased refrigerant pressure (i.e., compression) as the refrigerant velocity is slowed upon transfer to a sealed cavity formed between a second bearing housing 200*a* and the second housing end portion 132. Compressed refrigerant exits the second compression stage 126 via the second refrigerant exit 120 (FIG. 1).

Figure 3:
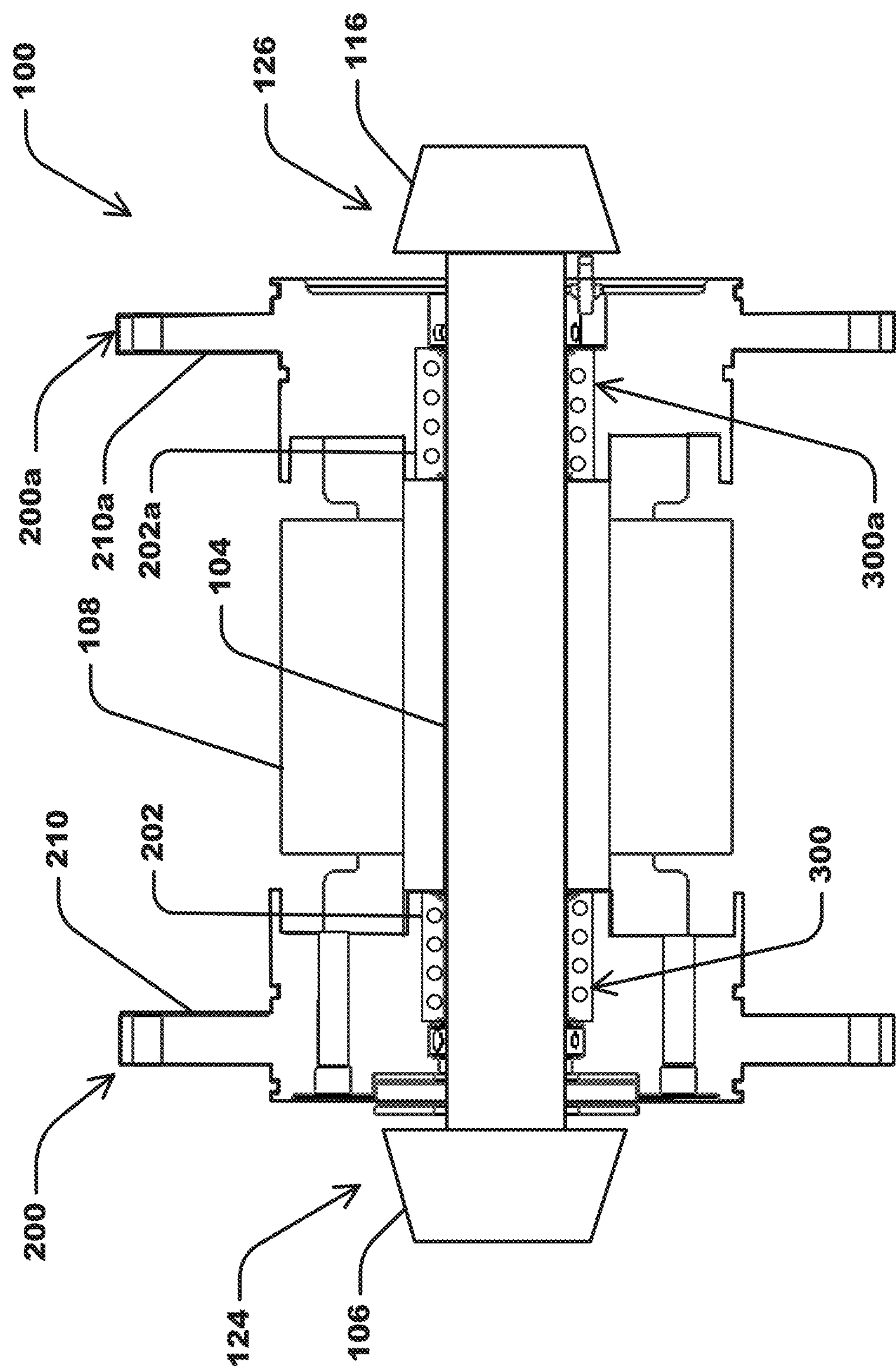
FIG. 3 is a cross-sectional view of the compressor system of FIG. 2 with the external compressor housing removed.

Referring to FIG. 2 and FIG. 3, the first impeller 106 and second impeller 116 are coupled at opposite ends of a driveshaft 104. The driveshaft 104 is operatively coupled to a motor 108 positioned between the first impeller 106 and second impeller 116 such that the first impeller 106 and second impeller 116 are rotated at a rotation speed selected to compress the refrigerant to a pre-selected pressure exiting the second refrigerant exit 120. Any suitable motor may be incorporated into the compressor system 100 including, but not limited to, an electrical motor. The driveshaft 104 is supported by foil bearing assemblies 300/300*a*, as described in additional detail below.

Each bearing housing 200/200*a* includes a sleeve 202/202*a* configured to retain a respective one of the foil bearing assemblies 300/300*a* therein. Each bearing housing 200/200*a* further includes a mounting structure 210/210*a* used to couple each bearing housing 200/200*a* to the first housing end portion 130 and second housing end portion 132, as illustrated in FIG. 2.

Figure 4:
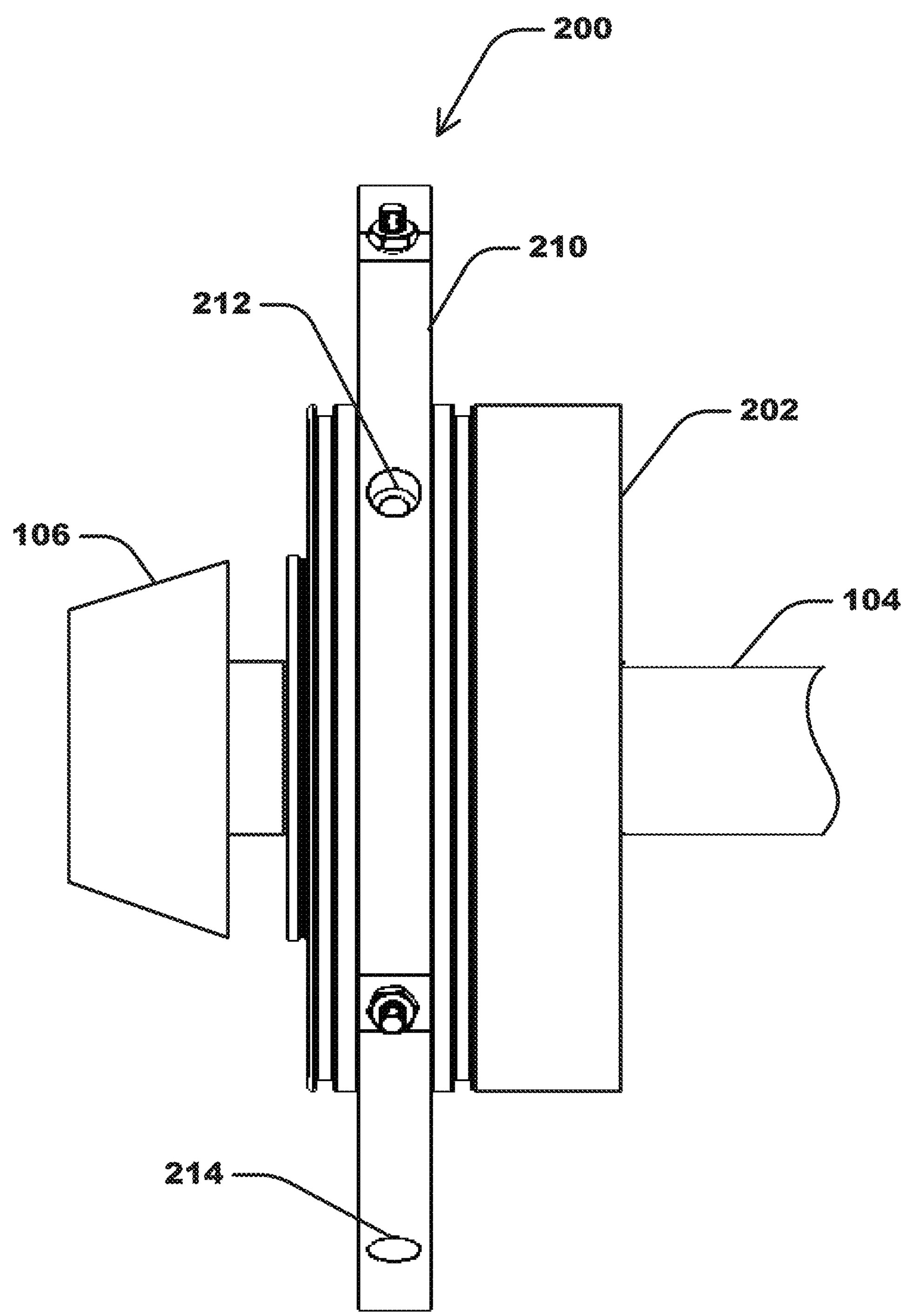
FIG. 4 is a side view of an impeller mounted to an end of a driveshaft in which the driveshaft is supported by a bearing housing.
Figure 5:
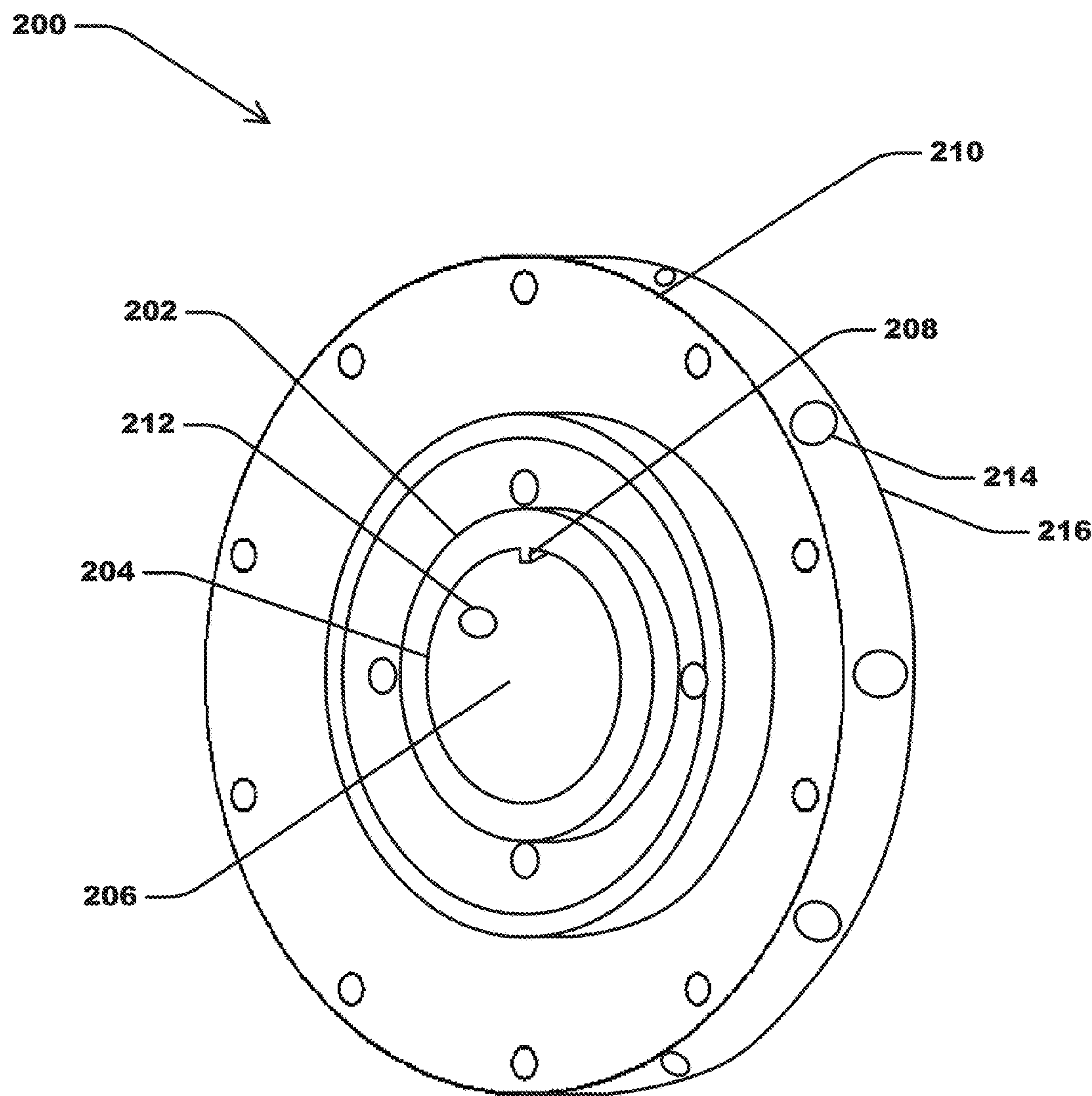
FIG. 5 is a rear perspective view of the bearing housing shown in FIG. 4.
Figure 6:
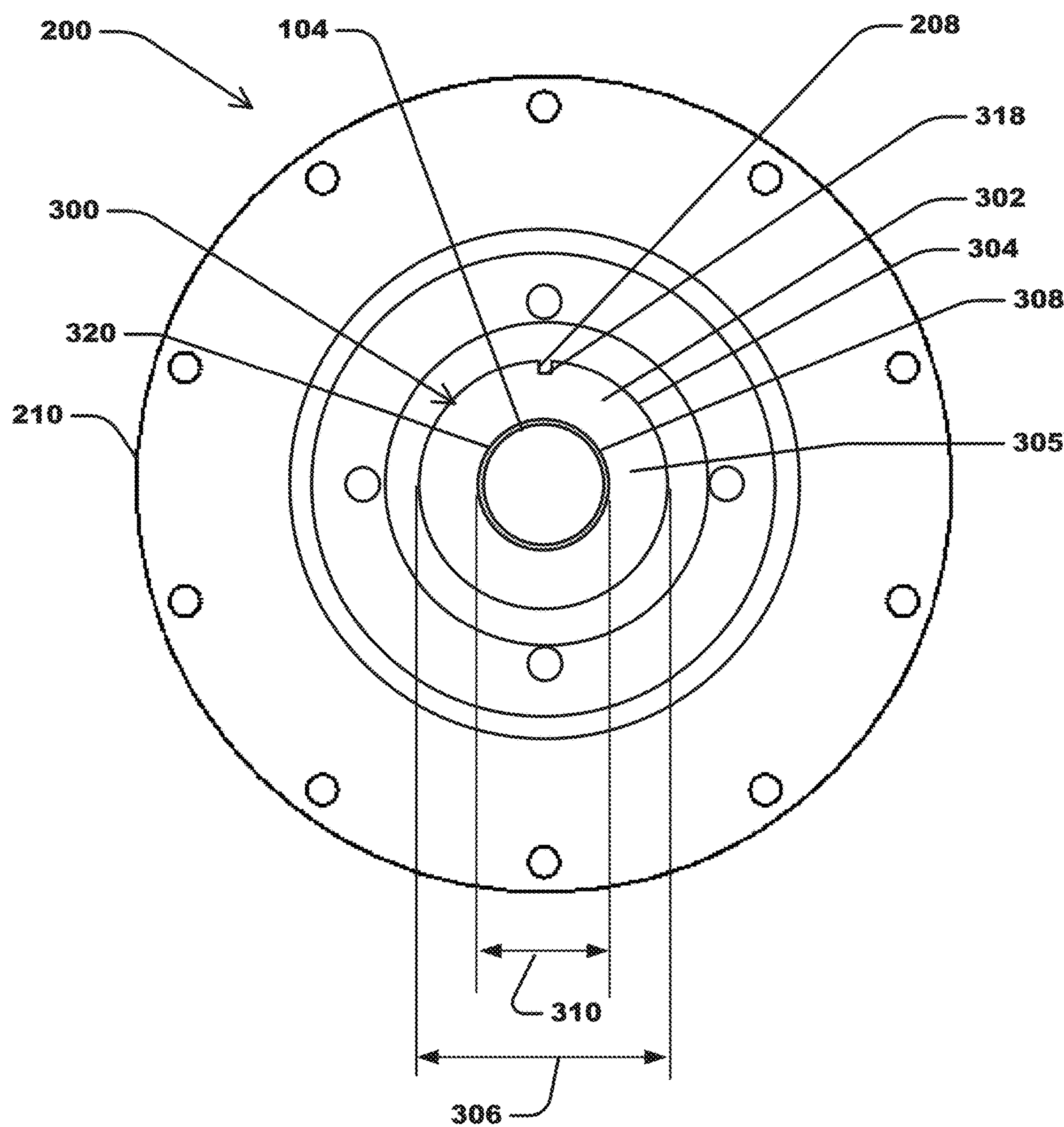
FIG. 6 is a rear view of the bearing housing shown in FIG. 5 with a foil bearing assembly installed in accordance with an aspect of the disclosure.

With additional reference to FIG. 4, the foil bearing assembly 300 (FIG. 3) retained within the sleeve 202 of the bearing housing 200 supports the driveshaft 104. The driveshaft 104 projects through the bearing housing 200 opposite the sleeve 202, and the first impeller 106 is coupled to the projecting end of the driveshaft 104. Referring to FIG. 5 and FIG. 6, the bearing housing 200 has a cylindrical bore 206 defined therein that receives the foil bearing assembly 300. The cylindrical bore 206 is bounded by a radial inner wall 204 within the sleeve 202 of the bearing housing 200. A coolant inlet passage 212 and a coolant outlet passage 214 formed within the bearing housing extend from a radial outer edge 216 of the bearing housing 200 to openings formed within the inner wall 204 of the cylindrical bore 206. The coolant inlet passage 212 and coolant outlet passage 214 are configured to provide coolant to the foil bearing assembly 300 as described in additional detail below.

The bearing housing 200 includes a mounting structure 210 for coupling the bearing housing 200 to the compressor housing 102, as illustrated in FIG. 1 and FIG. 2. The mounting structure 210 generally projects in a radially outward direction to a dimension matched to the outer dimension of the compressor housing 102. The bearing housing 200 may include any form of mounting structure 210 without limitation including, but not limited to, an annular flange. In one aspect, the bearing housing 200 is coupled to the first housing end portion 130 of the compressor housing 102 to form a sealed compartment enclosing the first compression stage 124 to enhance the effectiveness of the refrigerant pressure rise resulting from the impeller-induced acceleration and expansion into the sealed compartment, as described above. In another aspect, a second bearing housing 200*a* is coupled to the second housing end portion 132 of the compressor housing 102 to form a sealed compartment enclosing the second compression stage 126 in a similar manner. In various additional aspects, the bearing housing 200 may further serve as a mounting structure for a variety of elements including, but not limited to, radial bearings such as the foil bearing assembly 300 described above, a thrust bearing, and sensing devices used as feedback for passive or active control schemes such as proximity probes, pressure transducers, thermocouples, key phasers, and the like. In yet another aspect, the bearing housing 200 may further include coolant conduits (e.g., coolant inlet and outlet passages 212/214) to enable active cooling of the foil bearing assembly 300, as described in detail below.

Referring to FIG. 6, the foil bearing assembly 300 includes a cylindrical body 302 retained within the cylindrical bore 206 (FIG. 5) of the bearing housing 200. The cylindrical body 302 has an outer surface including a radial outer surface 304 and opposing axial or end surfaces 305 (only one shown in FIG. 6 and FIG. 7), and an inner surface including a radial inner surface 308. The radial outer surface 304 defines an outer diameter 306 of the cylindrical body 302, and the radial inner surface 308 defines an inner diameter 310 of the cylindrical body 302. The radial outer surface 304 is sized and dimensioned to fit closely to the inner wall 204 (FIG. 5) of the bearing housing 200. In one aspect, the cylindrical body 302 has a circular cross-sectional profile matched to the circular cross-sectional profile of the cylindrical bore 206 of the bearing housing 200. In various other aspects, the cylindrical bore 206 and the cylindrical body 302 have matched cross-sectional profiles of any suitable shape without limitation. Non-limiting examples of suitable matched cross-sectional profiles of the cylindrical bore 206 and the cylindrical body 302 include symmetrical and asymmetrical conic sections such as circular, elliptical, and hyperbolic profiles, and symmetrical and asymmetrical polygonal profiles such as triangular, square, pentagonal, hexagonal, and other higher-order polygonal profiles.

The radial outer surface 304 of the cylindrical body 302 is further provided with a keyed feature 318 shaped to cooperatively engage a complementary keyed feature 208 formed at the inner wall 204 of the bearing housing 200. In one aspect, the interlocked keyed feature 318 and complementary keyed feature 208 inhibit the rotation of the foil bearing assembly 300 within the cylindrical bore 206 during operation of the compressor system 100. In another aspect, the interlocked keyed feature 318 and complementary keyed feature 208 orient the foil bearing assembly 300 within the cylindrical bore 206 at a consistent orientation for all foil bearing assemblies within an interchangeable family of foil bearing assemblies. Such a consistent orientation enables alignment of openings of the coolant inlet and outlet passages 212/214 within the inner wall 204 of the cylindrical bore 206 with corresponding openings in the outer surface of the cylindrical body 302 (e.g., the radial outer surface 304 or the end surfaces 305 of cylindrical body 302) to form a continuous conduit for coolant used to cool the cylindrical body 302 as described in additional detail below.

The keyed feature 318 and interlocking complementary keyed feature 208 may be any suitable form of matched mechanically interlocking features without limitation. Non-limiting examples of suitable matched mechanically interlocking features include matching elevated and depressed features such matched axial ridges, keys, and tabs, and matching depressed features such as axial slots, axial keyholes and keepers. In one aspect, the keyed feature 318 is an axial slot and the complementary keyed feature 208 is an axial ridge, as illustrated in FIG. 6. In yet other embodiments, the keyed feature 318 and the complementary keyed feature 208 may be omitted (see, e.g., FIG. 21 and FIG. 22).

The cylindrical body 302 of the foil bearing assembly 300 further includes a foil bearing 320 retained within the radial inner surface 308 of the cylindrical body 302. In one aspect, the foil bearing 320 is in thermal communication with the radial inner surface 308 of the cylindrical body 302 for conductive heat transfer therebetween. The foil bearing 320 may be any suitable foil bearing without limitation including, but not limited to, foil bearings with a single compliant internal surface and with two or more compliant internal surface sections.

Figure 7:
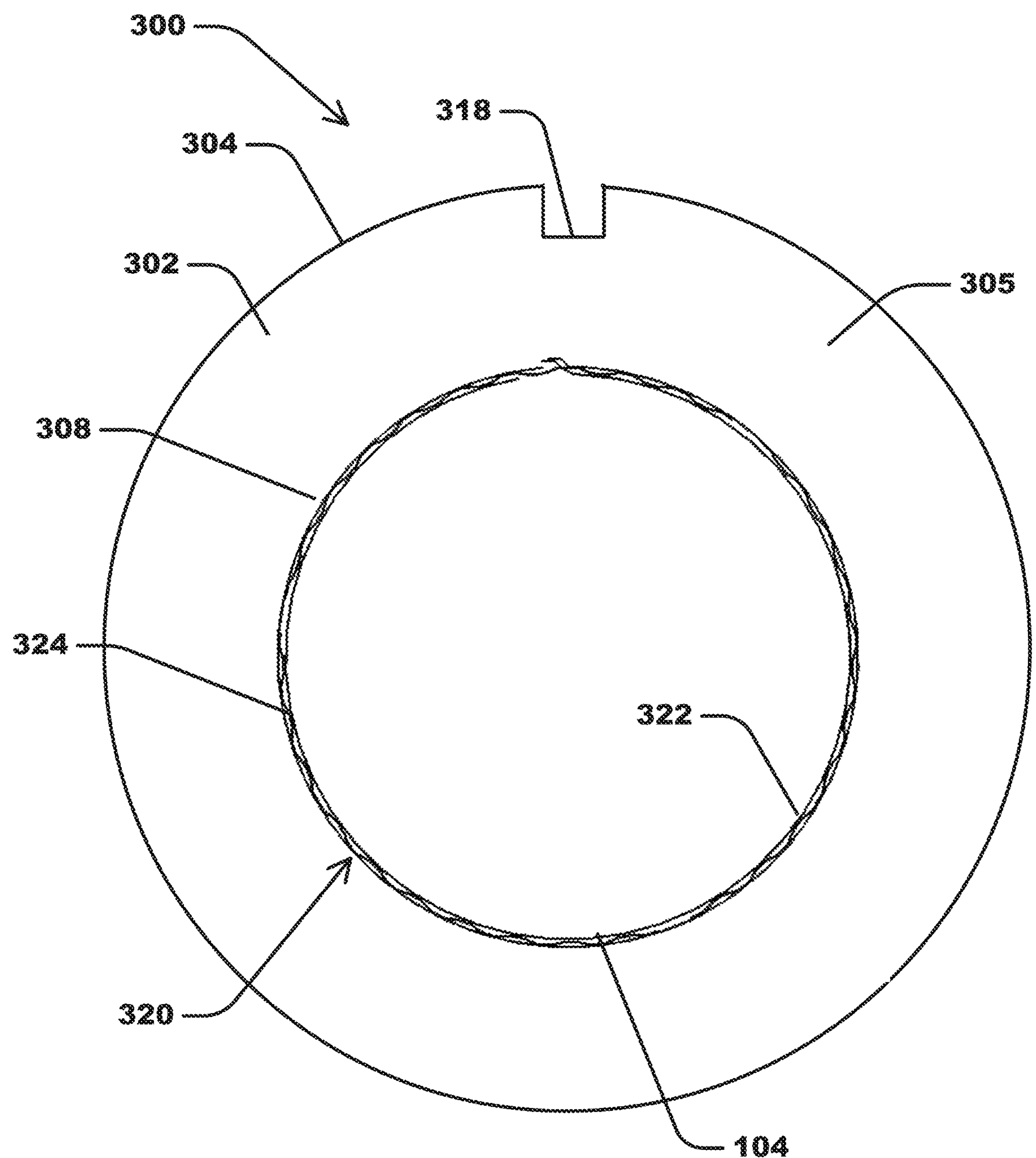
FIG. 7 is a rear view of the foil bearing assembly shown in FIG. 6.

Referring to FIG. 7, the foil bearing 320 includes a compliant foil layer 322 in contact with the driveshaft 104 in one aspect. In this aspect, the foil bearing 320 further includes a bump layer 324 positioned adjacent to the radial inner surface 308 of the cylindrical body 302. That is, the bump layer 324 is positioned radially between the compliant foil layer 322 and the radial inner surface 308 of the cylindrical body 302. The bump layer 324 may be formed from any suitable radially elastic structure without limitation including, but not limited to, an array of deformable bumps or other features designed to deform and rebound under intermittent compressive radial loads, and any other elastically resilient material capable of compressing and rebounding under intermittent compressive radial loads to provide a resilient surface for the rotating driveshaft 104 during operation of the compressor system 100. In some aspects, the bump layer 324 may be coupled to at least one adjacent layer including, but not limited to, the compliant foil layer 322. In another aspect, the bump layer 324 may be free-floating and not coupled to any layer of the foil bearing 320. The foil bearing 320 may be provided in any suitable form without limitation. In some aspects, the foil bearing assembly 300 may be provided with two layers, three layers, four layers, or additional layers without limitation. The layers of the foil bearing 320 form an essentially cylindrical tube sized to receive the driveshaft 104 with relatively little gap design between the driveshaft 104 and the foil bearing 320 as determined by known foil bearing design methods. Any suitable method for affixing the foil bearing 320 within foil bearing assembly 300 may be used without limitation. Non-limiting examples of suitable methods include keepers and retaining clips, adhesive, set screws, and any other suitable affixing method.

Figure 8:
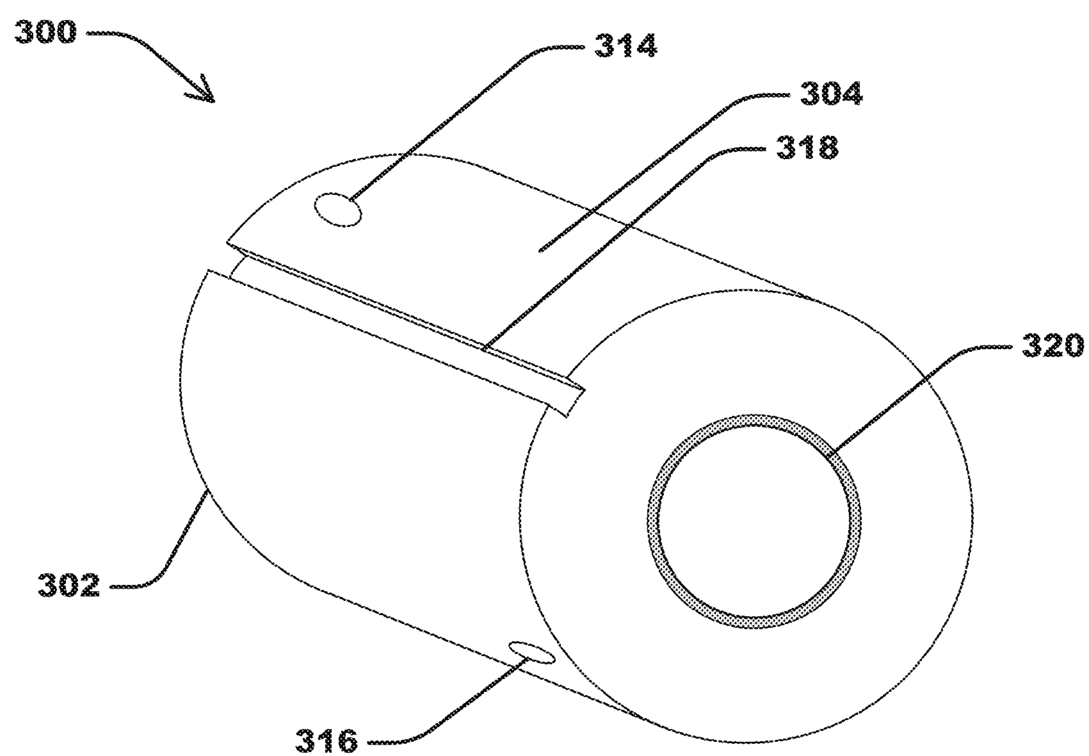
FIG. 8 is a perspective view of the foil bearing assembly according to a first aspect of the disclosure.
Figure 9:
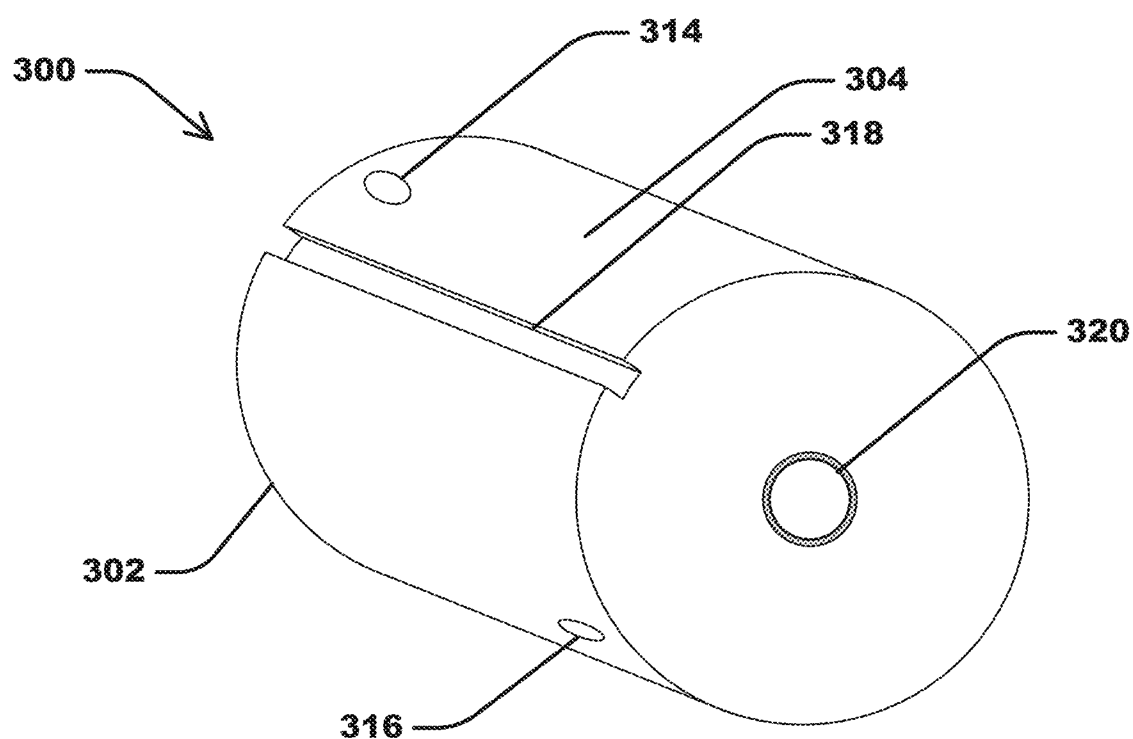
FIG. 9 is a perspective view of the foil bearing assembly according to a second aspect of the disclosure.
Figure 12:
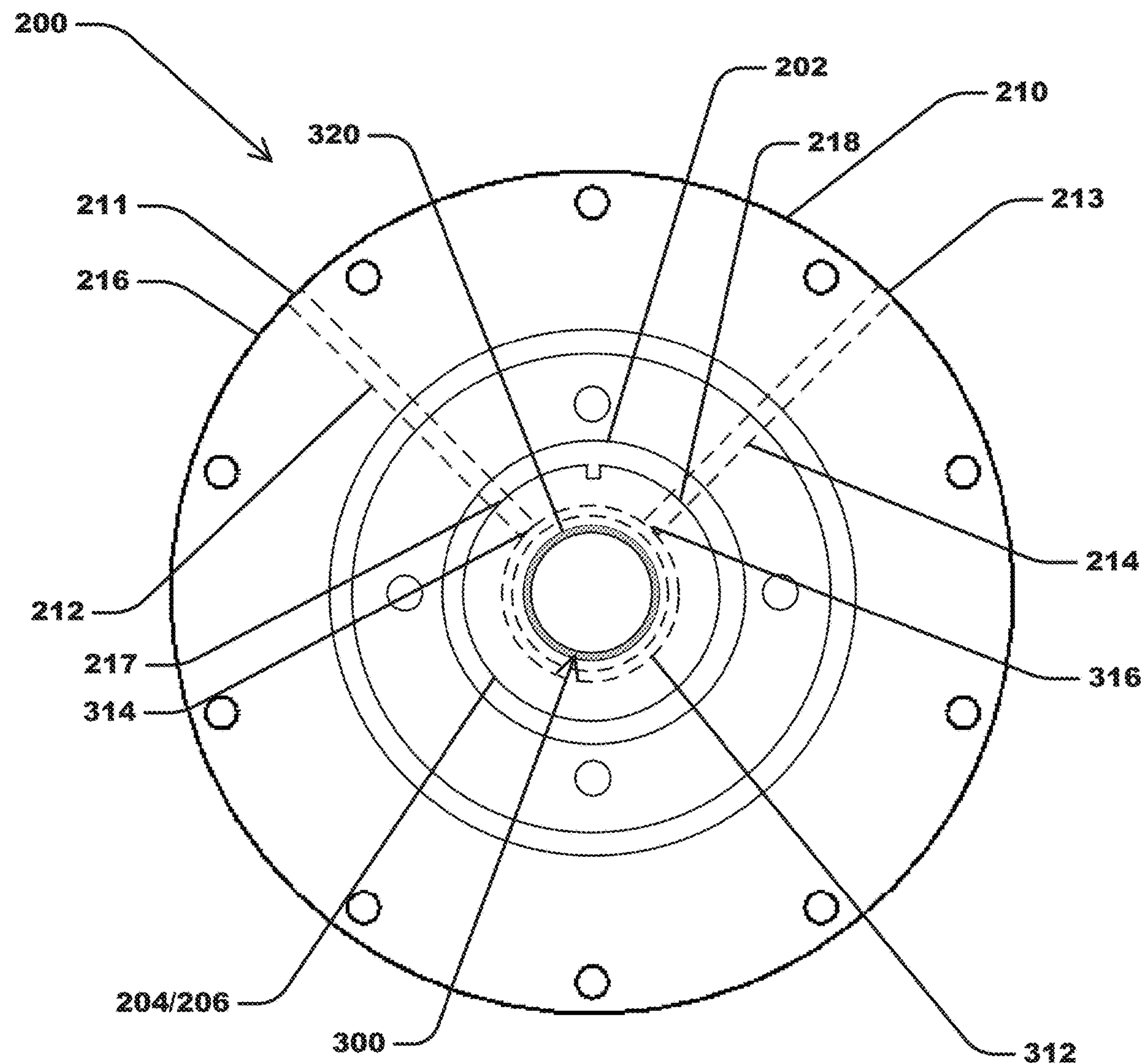
FIG. 12 is a rear view of the bearing housing and foil bearing assembly shown in FIG. 6 illustrating a pair of coolant conduits and a foil heat exchange conduit formed within the bearing housing and the foil bearing assembly, respectively.

Referring to FIGS. 8, 9, and 12, the cylindrical body 302 of the foil bearing assembly 300 further includes a coolant intake port 314 and a coolant outlet port 316. In the illustrated embodiment, the coolant intake port 314 and the coolant outlet port 316 are formed in the radial outer surface 304 of the cylindrical body 302. In other embodiments, one or both of the coolant intake port 314 and the coolant outlet port 316 may be formed along an axial face or end surface 305 of the cylindrical body 302. As shown in FIG. 12, the cylindrical body 302 further defines a cooling fluid passage 312 between the radial outer surface 304 and the radial inner surface 308 that extends from the intake port 314 to the outlet port 316. The cooling fluid passage 312 receives a coolant fluid from the coolant inlet passage 212 to enable conductive heat exchange between the cylindrical body 302 and the foil bearing 320, as described in more detail herein.

As shown in FIG. 12, when the cylindrical body 302 is installed within the cylindrical bore 206 of the bearing housing 200, the coolant intake port 314 is connected in fluid communication with the coolant inlet passage 212, and the coolant outlet port 316 is connected in fluid communication with the coolant outlet passage 214. Within a family of foil bearing assemblies, the position of the coolant intake port 314 and the coolant outlet port 316 may be positioned at essentially the same positions, as illustrated in FIGS. 8 and 9, to facilitate the interchangeability of a first cylindrical body 302 (see FIG. 8) with a second cylindrical body 302 (see FIG. 9) without need to reconfigure the positions of the coolant inlet and outlet passages 212/214 within the bearing housing 200. By way of non-limiting example, a first cylindrical body (see FIG. 8) may be interchanged with second cylindrical body (see FIG. 9) to alter a diameter of the foil bearing 320 to accommodate different driveshaft diameters. In some embodiments, mechanically interlocking the keyed feature 318 of the cylindrical body with the complementary keyed feature 208 of the bearing housing 200 may facilitate aligning the coolant intake port 314 and the coolant outlet port 316 with the coolant inlet passage 212 and the coolant outlet passage 214, respectively. In other embodiments, the cylindrical body 302 may include one or more circumferential or circular grooves in the outer surface of the cylindrical body in which the coolant intake port 314 and the coolant outlet port 316 are located (see, e.g., FIG. 21 and FIG. 22) such that the coolant intake port 314 and the coolant outlet port 316 do not need to be exactly radially aligned with the respective inlet and outlet passages 212 and 214.

Figure 10:
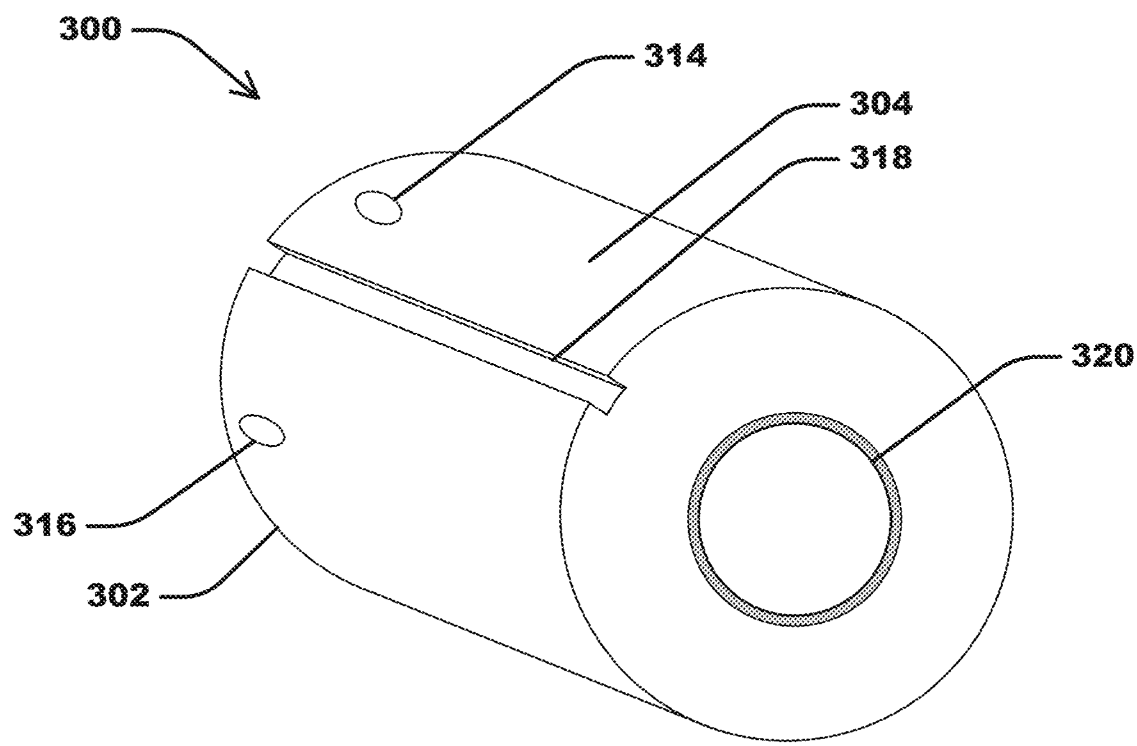
FIG. 10 is a perspective view of the foil bearing assembly according to a third aspect of the disclosure.
Figure 11:
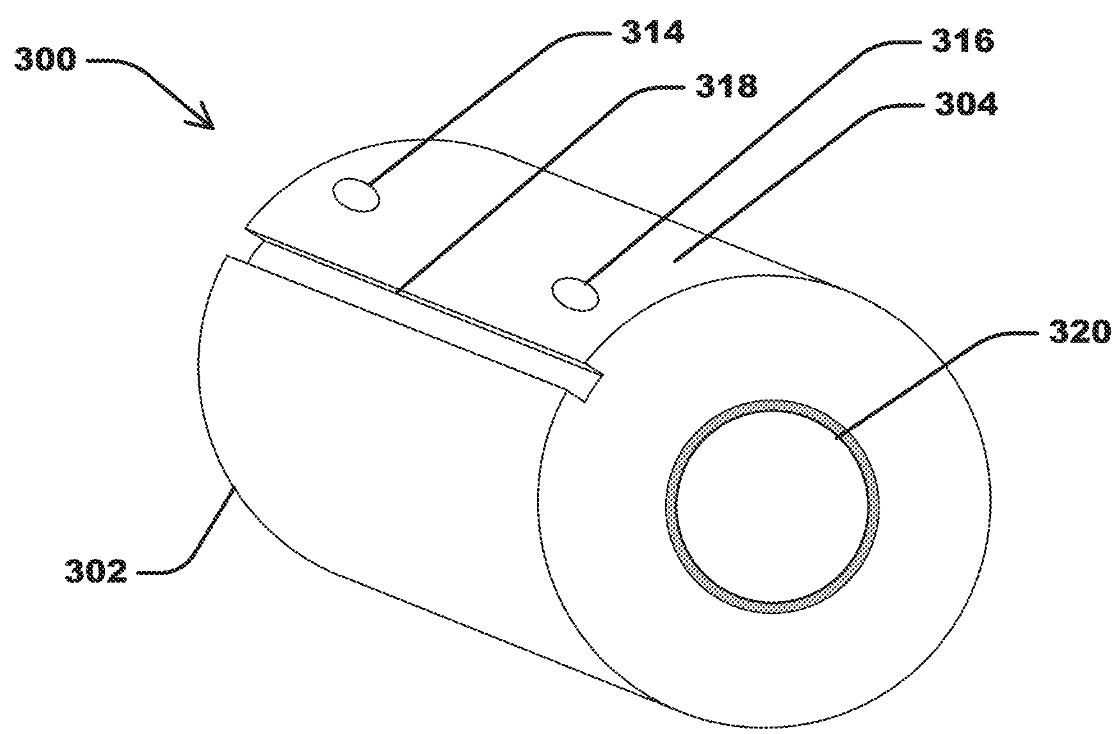
FIG. 11 is a perspective view of the foil bearing assembly according to a fourth aspect of the disclosure.

The coolant intake port 314 and the coolant outlet port 316 are positioned at any suitable positions on the cylindrical body 302. In some embodiments, for example, the coolant intake port 314 and the coolant outlet port 316 are positioned to match the corresponding positions of the coolant inlet passage 212 and the coolant outlet passage 214 within the bearing housing 200. Referring to FIG. 9, the coolant intake port 314 and the coolant outlet port 316 are positioned at different ends and different angular positions of the cylindrical body 302. In other embodiments, the coolant intake port 314 and the coolant outlet port 316 may be positioned at the same end and at different angular positions of the cylindrical body 302, as shown in FIG. 10. In yet other embodiments, the coolant intake port 314 and the coolant outlet port 316 may be positioned at different ends and at the same angular position of the cylindrical body 302, as shown in FIG. 11. In various additional aspects, the coolant intake port 314 and the coolant outlet port 316 may be positioned at any suitable position on the radial outer surface 304 and or at either axial end surface 305 of the cylindrical body 302 without limitation.

Figure 21:
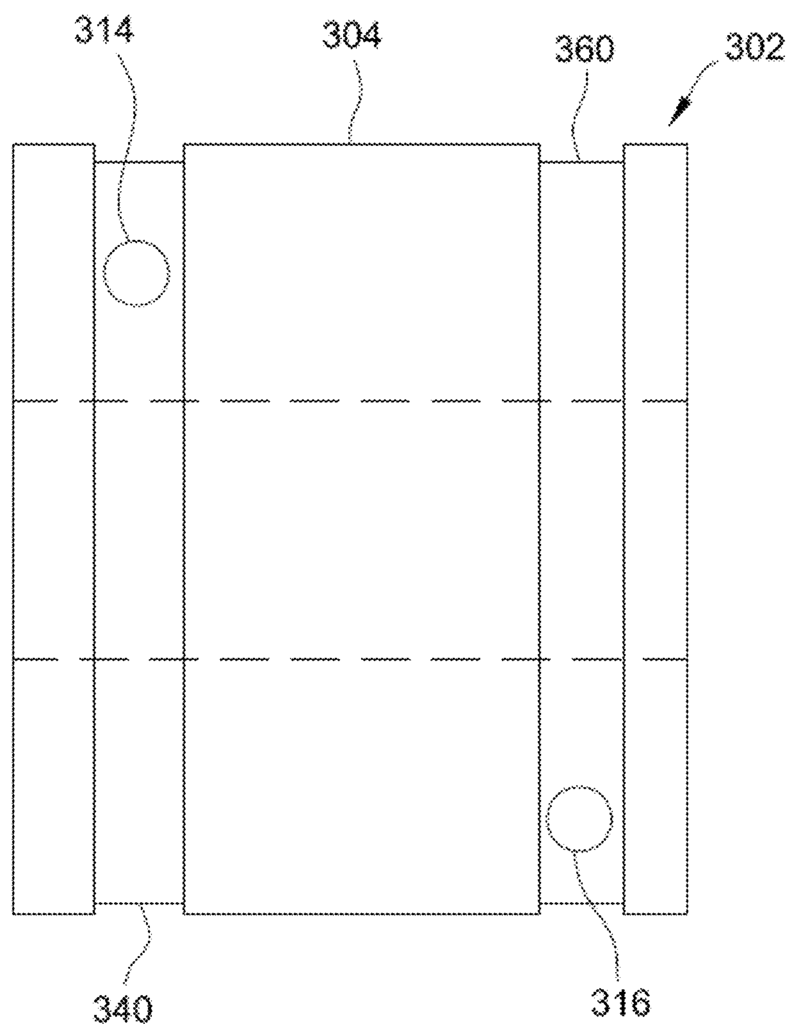
FIG. 21 is a side view of the foil bearing assembly including annular grooves defined on a radial outer surface of the foil bearing assembly.
Figure 22:
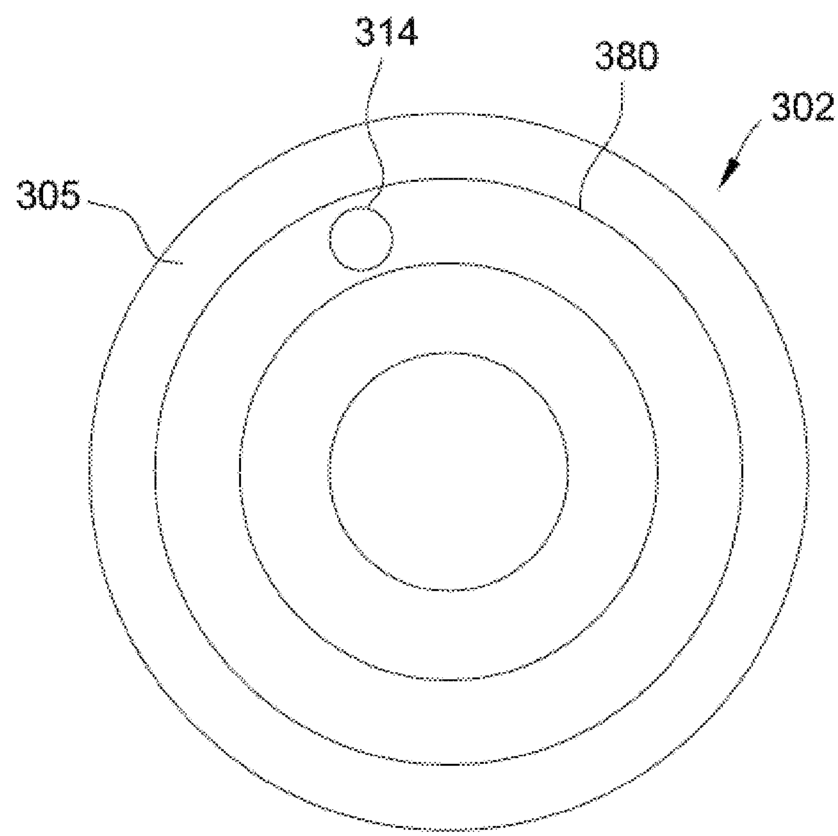
FIG. 22 is an end view of the foil bearing assembly including a circular groove defined on an end surface of the foil bearing assembly.

In some embodiments, the cylindrical body 302 may include one or more grooves defined in the outer surface (e.g., in the radial outer surface 304 or one or both of the axial end surfaces 305) in which the coolant intake port 314 and/or the coolant outlet port 316 are positioned. The grooves may be, for example, circumferential grooves 340, 360 (FIG. 21) defined in the radial outer surface 304, or arcuate grooves 380 defined in one or both of the axial end surfaces 305 (FIG. 22). The grooves may extend partially around the cylindrical body 302 or, as shown in FIG. 21 and FIG. 22, the grooves may extend entirely around the cylindrical body 302 to form annular grooves 340, 360 (FIG. 21) or ring-shaped grooves 380 (FIG. 22). The grooves function as fluid channels and provide fluid communication between the fluid inlet passage 212 and coolant intake port 314, or between the fluid outlet passage 214 and the coolant outlet port 316. Positioning the coolant intake port 314 and the coolant outlet port 316 in grooves on the outer surface of the cylindrical body 302 reduces or eliminates the need to radially align the coolant intake and outlet ports 314 and 316 with the respective inlet and outlet passages 212 and 214. For example, a cylindrical body 302 including annular grooves 340 and 360 in which the coolant intake port 314 and the coolant outlet port 316 are positioned can be installed in the bearing housing 200 in any radial orientation. That is, the annular grooves 340 and 360 need only be axially aligned with the respective inlet and outlet passages 212 and 214, such that fluid can flow through the annular grooves 340 and 360 to the respective coolant intake port 314 and coolant outlet port 316 positioned within the grooves 340 and 360. In these aspects, the keyed feature 318 may be omitted. Exemplary embodiments of separate circumferential grooves 340 and 360 are depicted in FIGS. 21 and 22. As shown in FIG. 21, the coolant intake port 314 and the coolant outlet port 316 are positioned within separate circumferential grooves 340 and 360. As shown in FIG. 22, an arcuate groove 380 extends circumferentially along the end surface 305.

Figure 13:
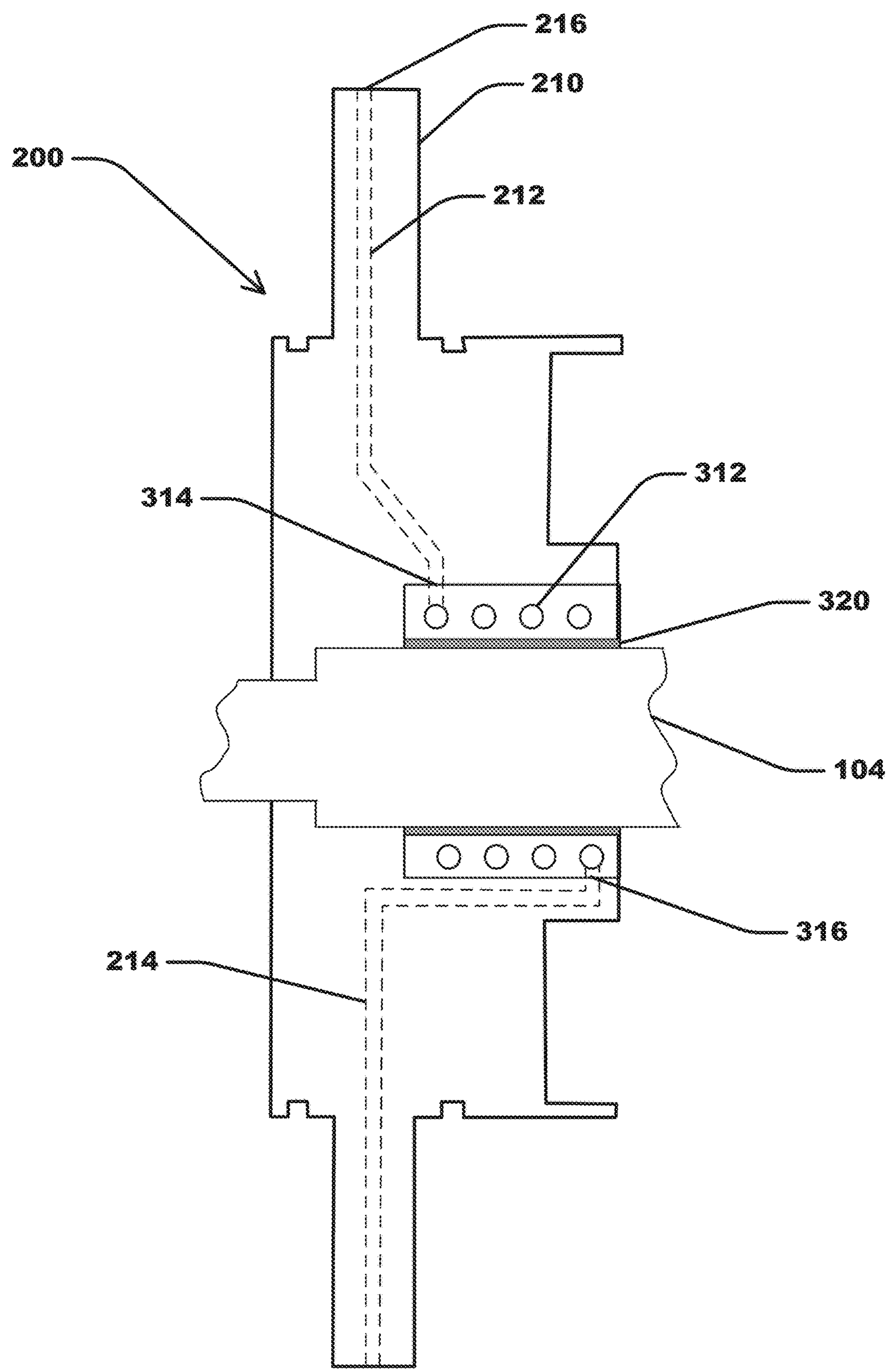
FIG. 13 is a cross-sectional view of the bearing housing shown in FIG. 4, illustrating a pair of coolant conduits and a foil heat exchange conduit according to a first aspect of the disclosure.
Figure 14:
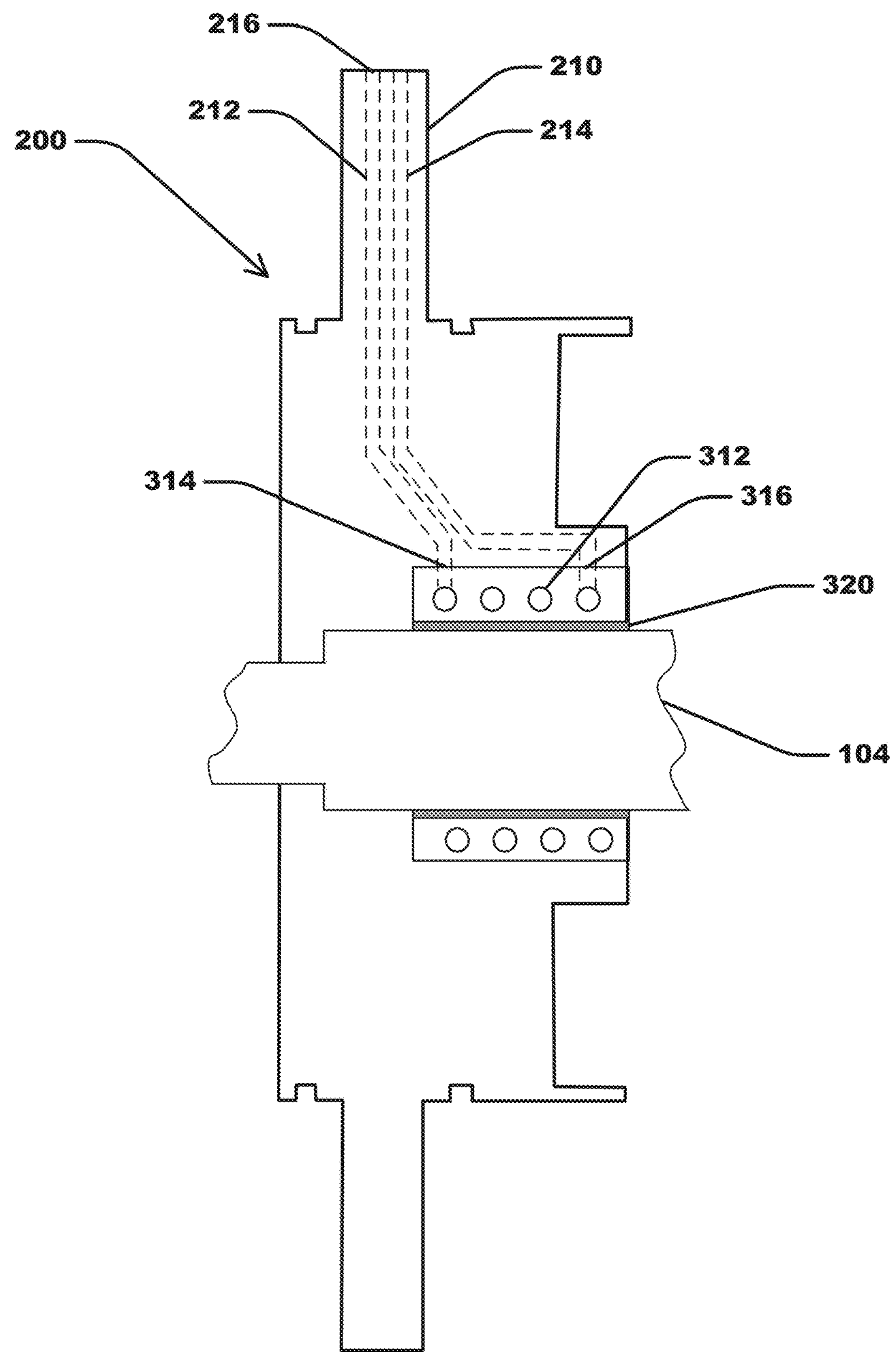
FIG. 14 is a cross-sectional view of the bearing housing shown in FIG. 4, illustrating a pair of coolant conduits and a foil heat exchange conduit according to a second aspect of the disclosure.
Figure 15:
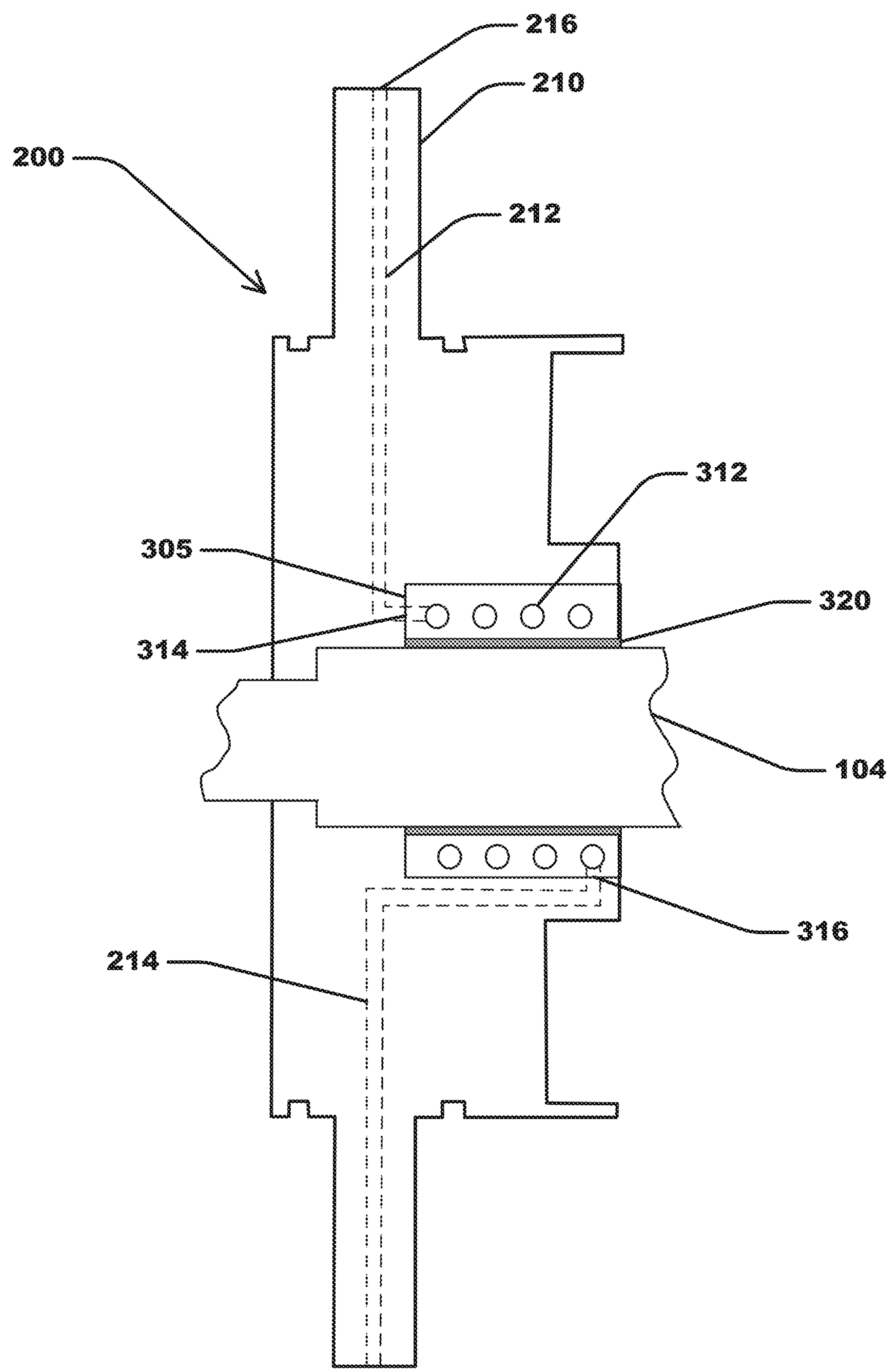
FIG. 15 is a cross-sectional view of the bearing housing shown in FIG. 4, illustrating a pair of coolant conduits and a foil heat exchange conduit according to a third aspect of the disclosure.

Referring to FIG. 12, the coolant inlet passage 212 and the coolant outlet passage 214 extend from openings 211 and 213, respectively, defined in the outer edge 216 of the bearing housing 200 inward to openings 217 and 218, respectively, formed in the inner wall 204 of the cylindrical bore 206. The coolant inlet passage 212 and the coolant outlet passage 214 connect with the coolant intake port 314 and the coolant outlet port 316, respectively, of the installed cylindrical body 302. In some embodiments, the coolant inlet passage 212 and the coolant outlet passage 214 may extend along any path through any portion of the bearing housing 200 including, but not limited to, the sleeve 202 and the mounting structure 210. Referring to FIG. 13, the coolant inlet passage 212 extends through the mounting structure 210 and sleeve 202 to the coolant intake port 314 positioned at one end of the radial outer surface 304, and the coolant outlet passage 214 extends through the mounting structure 210 and sleeve 202 at a different angular position to the coolant outlet port 316 positioned at the opposite end of the radial outer surface 304 of the foil bearing assembly 300. In other embodiments, the coolant inlet passage 212 and coolant outlet passage 214 may extend through the mounting structure 210 and sleeve 202 at a similar angular position within the bearing housing 200 to the coolant intake port 314 and coolant outlet port 316 positioned at opposite ends of the radial outer surface 304 of the foil bearing assembly 300, as shown in FIG. 14. In yet other embodiments, the coolant inlet passage 212 may extend through the mounting structure 210 and sleeve 202 to the coolant intake port 314 positioned at one of the end surfaces 305 of the foil bearing assembly 300, and the coolant outlet passage 214 may extend through the mounting structure 210 and sleeve 202 at a different angular position to the coolant outlet port 316 positioned at the opposite end of the foil bearing assembly 300 through the radial outer surface 304, as shown in FIG. 15. In any of these embodiments, the coolant intake port 314 and the coolant outlet port 316 may be positioned in separate grooves defined in the outer surface of the cylindrical body 302 as shown and described, for example, with reference to FIG. 21 and FIG. 22.

Any one or more of the openings of the coolant inlet passage 212 and coolant outlet passage 214 within the inner wall 204 of the bearing housing 200, the coolant intake port 314 and coolant outlet port 316 of the foil bearing assembly 300, and grooves formed in the outer surface of cylindrical body 302 (e.g., grooves 340, 360, or 380) may include additional elements to enable a sealed coolant circuit when the foil bearing assembly 300 is coupled to the bearing housing 200. The additional elements may be any suitable means of sealing including, but not limited to, gaskets, bellows, friction fits, and any other suitable sealing means.

Figure 23:
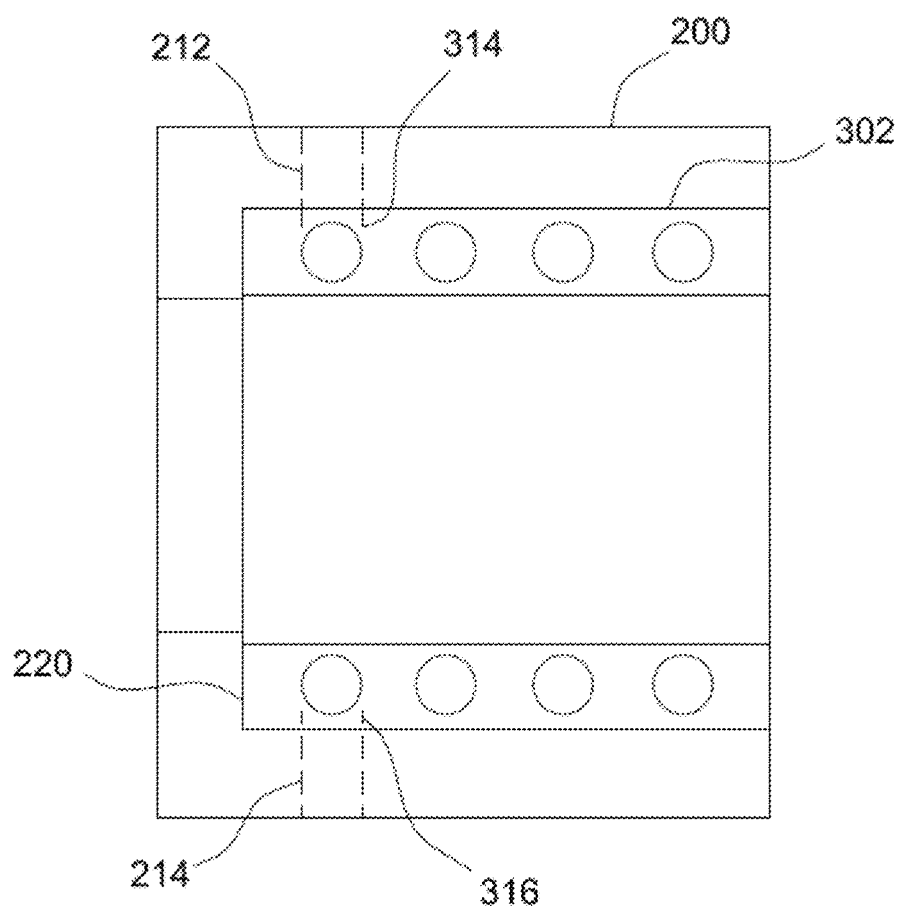
FIG. 23 is a sectional view of a foil bearing assembly with coolant intake and outlet ports that are axially aligned with respective coolant inlet and outlet passages of the bearing housing.
Figure 24:
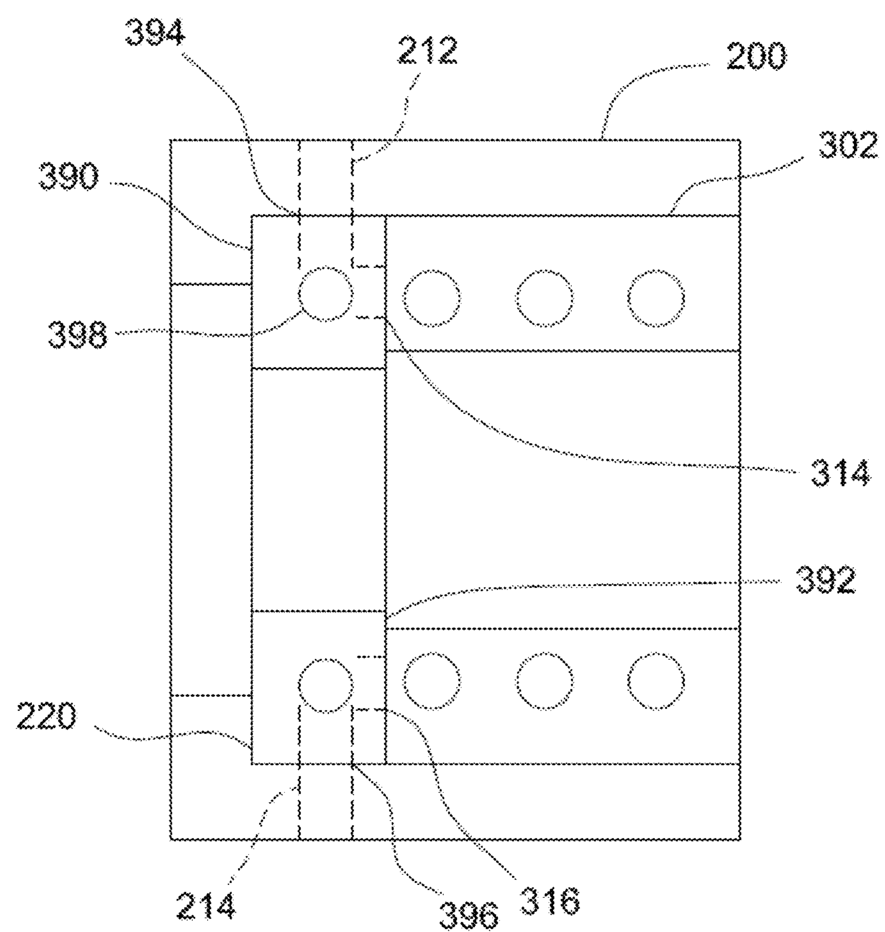
FIG. 24 is a sectional view of a foil bearing assembly with a spacer to accommodate axial misalignment of the coolant intake and outlet ports with respective coolant inlet and outlet passages of the bearing housing.

As illustrated in FIG. 23, the cylindrical body 302 in some embodiments may have an axial length that generally corresponds to an axial length of the bore 206 in the bearing housing 200 such that, when the cylindrical body 302 is installed in the bearing housing 200 and engages a stop 220 of the bearing housing 200 (FIG. 23), the coolant intake port 314 and the coolant outlet port 316 are axially aligned with the respective coolant inlet and outlet passages 212 and 214. In other embodiments, the cylindrical body 302 may have an axial length that does not correspond to an axial length of the bore 206. In such embodiments, an annular or ring-shaped spacer 390 (shown in FIG. 24) may be used in combination with the cylindrical body 302 to facilitate axial alignment of the coolant intake port 314 with the coolant inlet passage 212 and the coolant outlet port 316 with the coolant outlet passage 214. As shown in FIG. 24, the spacer 390 may be positioned axially between a portion of the bearing housing 200 (e.g., stop 220) and an axial end surface 305 of the cylindrical body to space the cylindrical body 302 a suitable axial distance to axially align the coolant intake port 314 and the coolant outlet port 316 with the respective coolant inlet and outlet passages 212 and 214. In some embodiments, the spacer 390 may have an inner diameter less than an inner diameter of the corresponding cylindrical body 302 to provide a stop 392 to prevent axial motion of the foil bearing 320 installed in the cylindrical body 302.

The spacer 390 includes a coolant intake port 394 and a coolant outlet port 396 that are axially aligned with the respective coolant inlet and outlet passages 212 and 214 of the bearing housing 200. Additionally, the spacer 390 includes a cooling fluid passage 398 that fluidly connects to the fluid cooling passage 312 of the cylindrical body 302. In other embodiments, the spacer 390 may not include coolant intake and outlet ports 394 and 396 or a cooling fluid passage 398.

A plurality of different spacers 390 having different axial lengths and different inner diameters may be provided to enable use of multiple cylindrical bodies 302 having different lengths and diameters with compressor system 100.

The cooling fluid passage 312 is configured to enhance conductive cooling of the foil bearing 320 by circulating a coolant received from the coolant inlet passage 212 and removed using the coolant outlet passage 214. The coolant circulated through the cooling fluid passage 312 may be obtained from any suitable source without limitation. Non-limiting examples of suitable coolant for use in the cooling fluid passage 312 of the foil bearing assembly 300 include economized or salvaged liquid refrigerant from an HVAC system. In one aspect, the coolant circulated through the cooling fluid passage 312 is transferred from the coolant circuit within the compressor including, but not limited to, the first compression stage 124, the second compression stage 126, and the refrigerant transfer conduit 112 via the refrigerant bleed 122. In another aspect, the coolant circulated through the cooling fluid passage 312 is provided via a separate coolant source that is isolated from the coolant circulating within the compressor system 100.

Figure 16:
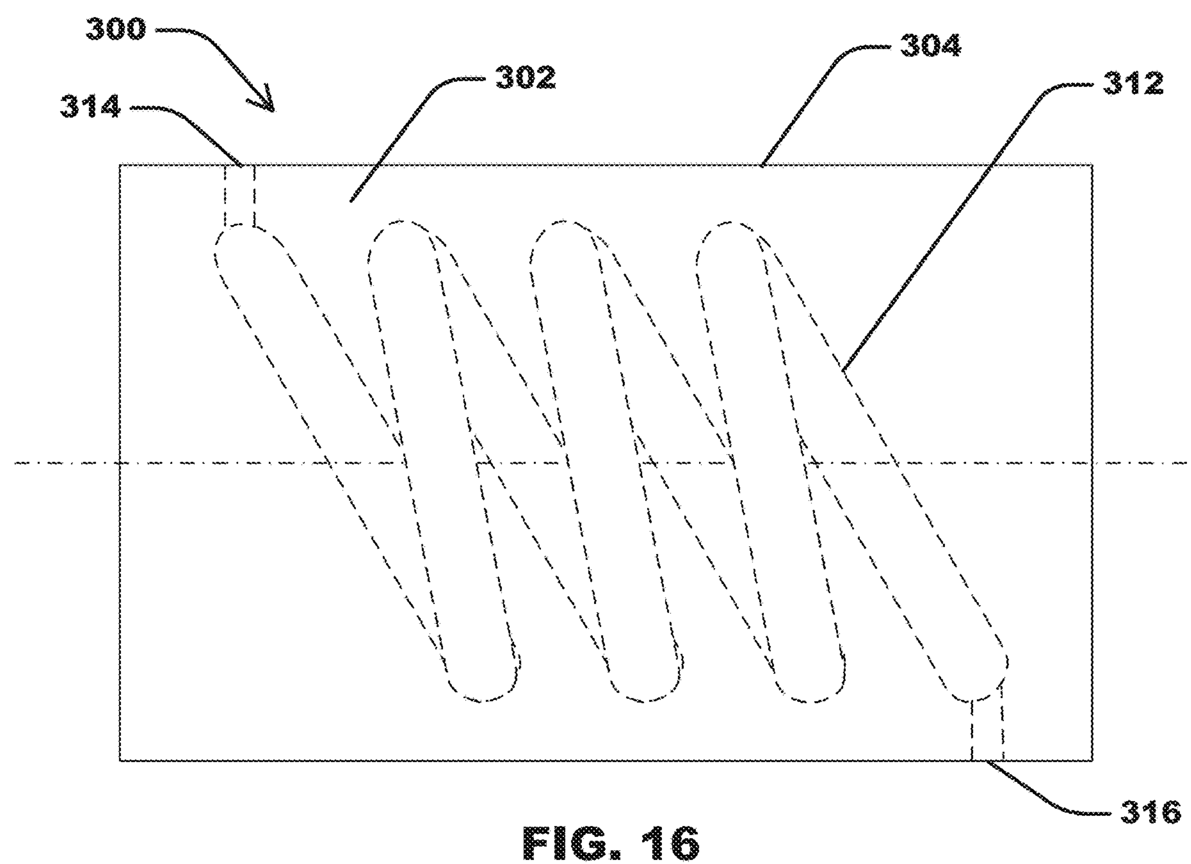
FIG. 16 is a side view of the foil bearing assembly shown in FIG. 7 with a cooling conduit formed as a single spiral conduit.
Figure 18:
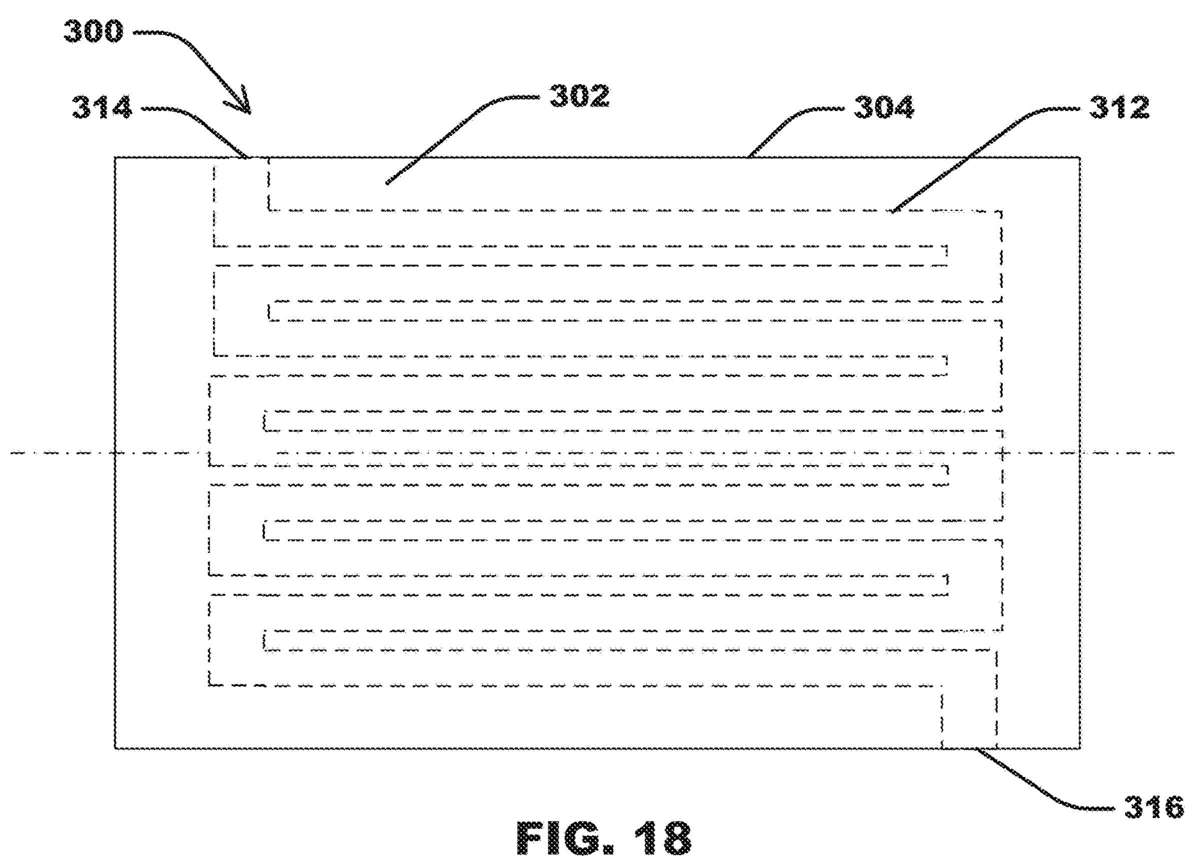
FIG. 18 is a side view of the foil bearing assembly shown in FIG. 7 with a cooling conduit formed as a single serpentine conduit.
Figure 19:
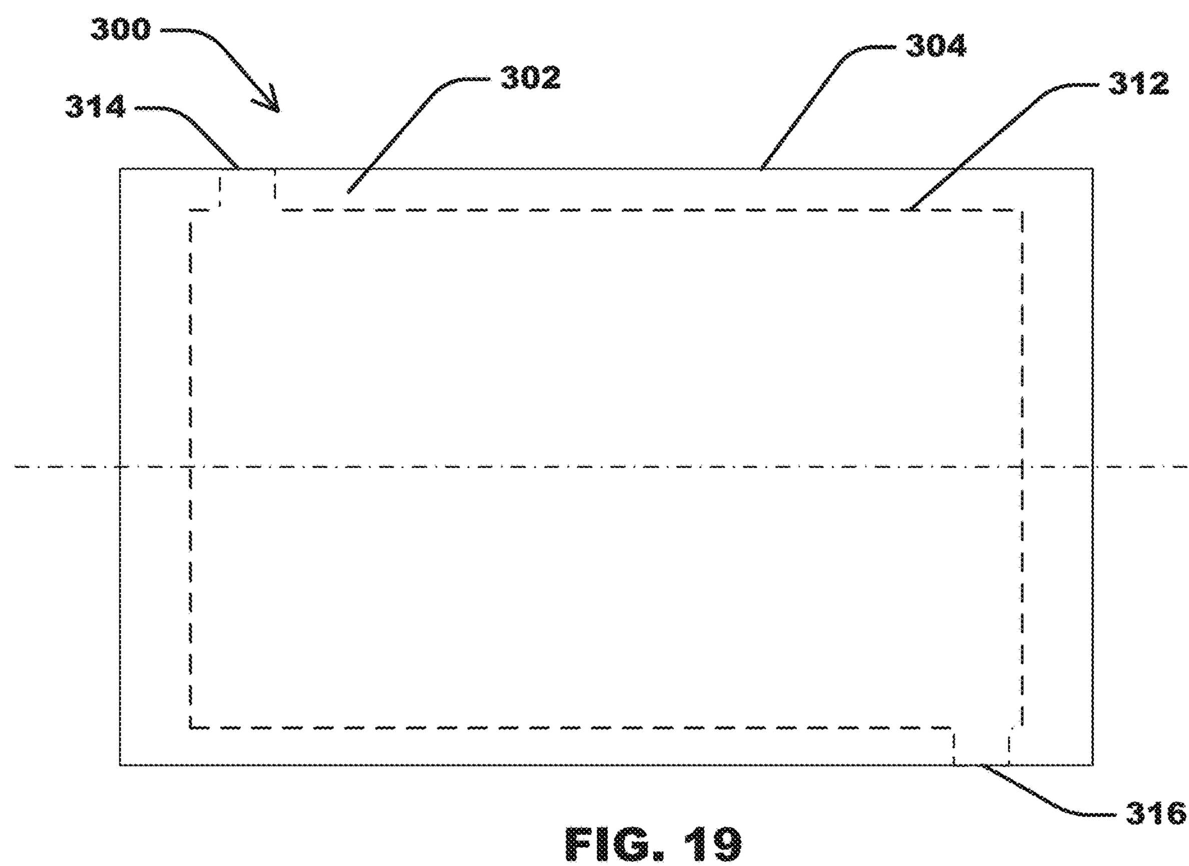
FIG. 19 is a side view of the foil bearing assembly shown in FIG. 7 with a cooling conduit formed as a single, open cavity.

The cooling fluid passage 312 is provided in any suitable coolant circulation pattern that positions at least a portion of the cooling fluid passage 312 in close proximity to the foil bearing 320 to enhance conductive cooling of the foil bearing 320. Referring to FIG. 16, the cooling fluid passage 312 is provided in a helical spiral pattern that includes a series of coils that direct the coolant flow repeatedly around the circumference of the foil bearing 320. In another embodiment, shown in FIG. 17, the cooling fluid passage 312 may be provided as a manifold pattern that includes a plurality of longitudinal or axially-extending tubes that direct coolant flow along a single direction from one end of the cylindrical body 302 to an opposite end of the cylindrical body 302. In another embodiment, shown in FIG. 18, the cooling fluid passage 312 may be provided as a serpentine pattern that includes a series of longitudinal passages or channels that direct coolant flow back and forth between opposite ends of the cylindrical body 302. In yet another embodiment, shown in FIG. 19, the cooling fluid passage 312 may be provided in the form of a single, open, continuous cavity forming a coolant layer that extends over at least a portion of the length and angular extent of the cylindrical body 302.

Figure 25:
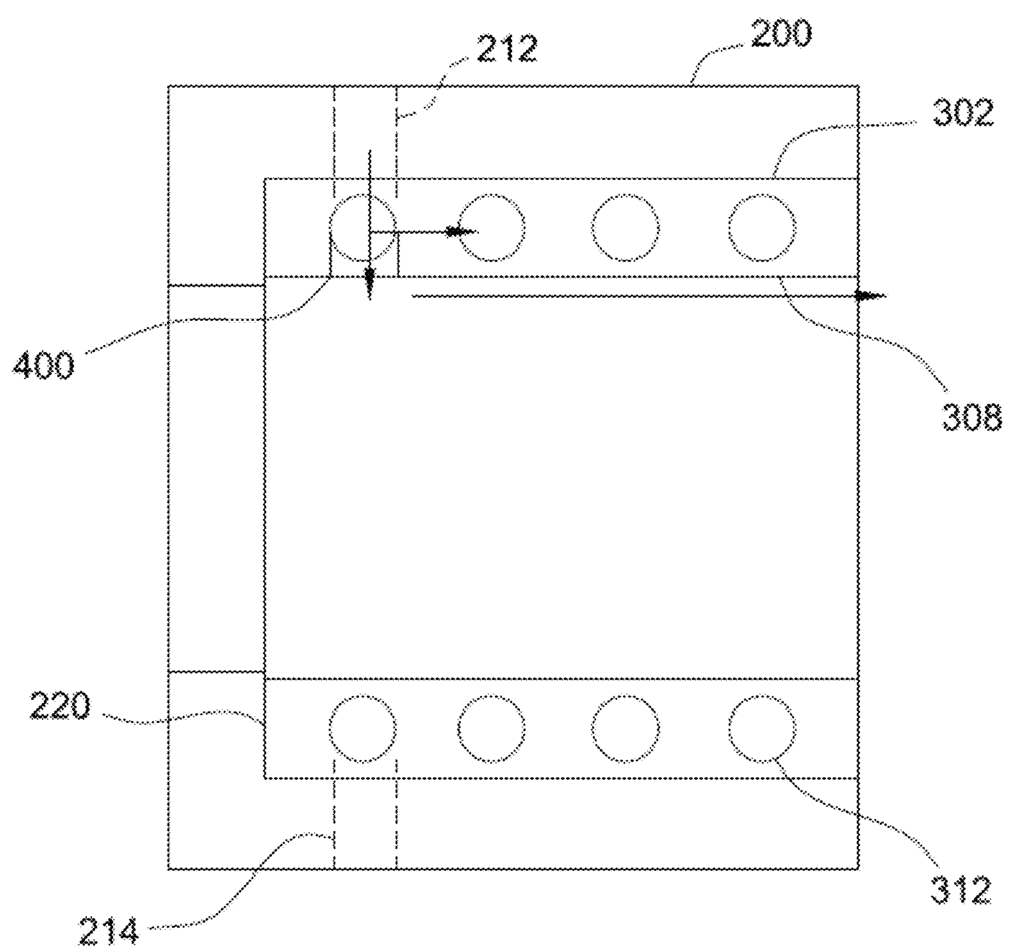
FIG. 25 is a sectional view of a foil bearing assembly with one or more openings to provide radially inward coolant flow to the foil bearing.
Figure 26:
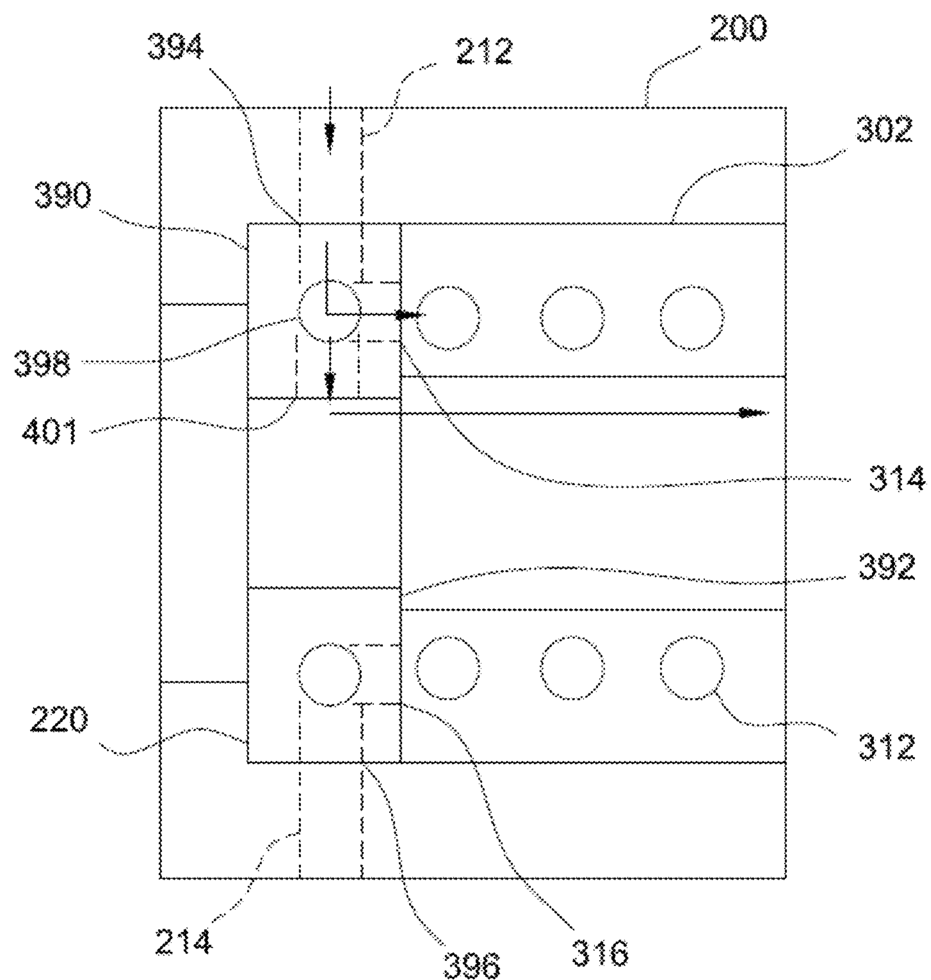
FIG. 26 is a sectional view of a foil bearing assembly with a spacer that includes one or more openings to provide radially inward coolant flow to the foil bearing.

The cooling fluid passage 312 is configured to allow coolant to flow radially inward and into contact with the foil bearing 320. As shown in FIG. 25, for example, the cylindrical body 302 may include one or more openings 400 defined in the radial inner surface 308 that are in fluid communication with the cooling fluid passage 312 to provide coolant flow radially inward towards the foil bearing 320. In this configuration, coolant flows radially inward from the cooling fluid passage 312 and along the axial length of the foil bearing 320. Such a coolant flow path may provide more direct cooling of the foil bearing 320. Similarly, where a spacer 390 (FIG. 24) is used with the cylindrical body 302, the spacer 390 may include an opening 401 (FIG. 26) along the radial inner surface thereof to allow coolant flow radially inward to the foil bearing 320.

The cylindrical body 302 is produced using any suitable manufacturing method without limitation. In some aspects, the cylindrical body 302 is produced using an additive manufacturing method including, but not limited, to 3D printing.

The foil bearing assembly 300 may be part of a family or plurality of foil bearing assemblies as described above. The foil bearing assemblies within a family of foil bearing assemblies each have the same radial outer diameter 306, same positions of the coolant intake and outlet ports 314/316 on the cylindrical body 302, and same position of the keyed feature 318 to facilitate interchangeability of any one foil bearing assembly for another within the family of foil bearing assemblies. In some aspects, each foil bearing assembly within a family of foil bearing assemblies may be essentially the same to enable routine maintenance and replacement of the foil bearing assembly over the working life of the compressor system. In various other aspects, each foil bearing assembly within a family of foil bearing assemblies may differ from one another in at least one feature including, but not limited to, inner diameter of the cylindrical body 302, design of foil bearing 320 such as materials and/or arrangement of foil elements, and coolant flow pattern within the cylindrical body 302. The foil bearing assemblies within a family of foil bearing assemblies may be interchanged to enable at least one modification of the compressor system including, but not limited to, modification of the diameter of the driveshaft 104 to accommodate different motors or alternative compressor power designs, modification of the cooling capacity using changes in coolant circulation patterns to modulate system performance characteristics such as heat transfer capacity, and modification of conductive cooling using changes in cylindrical body materials and the materials of other elements of the foil bearing assembly 300.

In various other aspects, the interchangeable foil bearing assemblies and bearing housing are implemented in connection with a method of assembling a compressor system. In one aspect, the method of assembling a compressor system described above includes selecting a first foil bearing assembly from a plurality of foil bearing assemblies for connection to the bearing housing of the compressor system as described above. In this aspect, the method further includes connecting the first foil bearing assembly to the bearing housing such that the intake and outlet ports are connected to a coolant inlet passage and a coolant return passage of the bearing housing as described above.

The first foil bearing assembly may be selected based on at least one of a cooling capacity of the compressor, a driveshaft diameter, a driveshaft weight, a driveshaft operating speed, a driveshaft material, and a type of refrigerant used in the compressor. In various other aspects, the first foil bearing assembly is selected based on at least one of a coolant circulation pattern of the cooling fluid passage, a stiffness of the foil bearing assembly (e.g., a stiffness of the cylindrical body, the compliant foil layer, and/or the bump layer) a load carrying capacity of the foil bearing, a foil bearing material, a cylindrical body material, the inner diameter of the first foil bearing assembly, a length of the foil bearing assembly, and one or more surface coatings of the foil bearing assembly (e.g., applied to the compliant foil layer or the bump layer).

Figure 20:
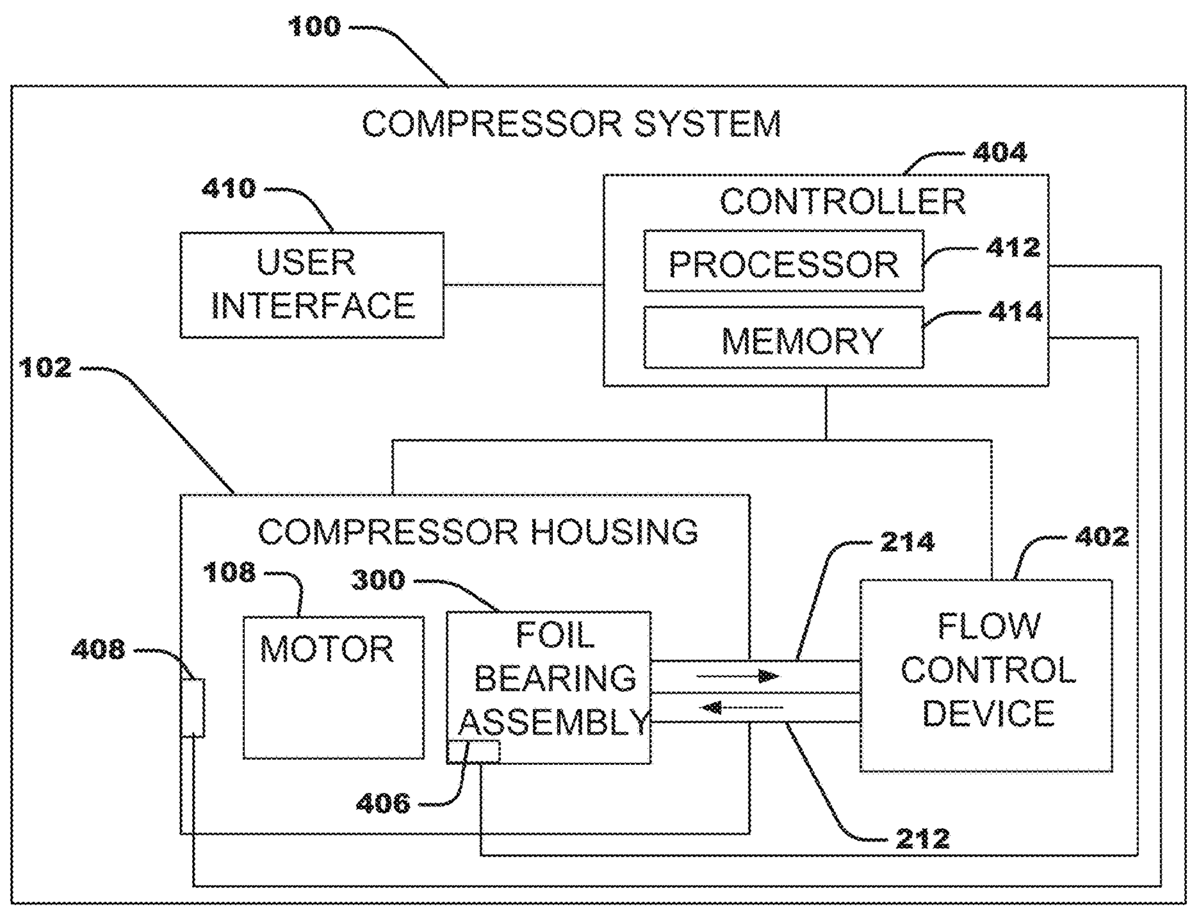
FIG. 20 is a block diagram of the compressor system shown in FIG. 1 including a flow control device and a controller.

In various additional aspects, the interchangeable foil bearing assemblies and bearing housing are implemented in connection with one or more methods of controlling the cooling of the foil bearings within a compressor system. FIG. 20 is a block diagram of the compressor system 100 including example elements for controlling the cooling of the foil bearings. In the illustrated embodiment, the compressor system 100 includes a flow control device 402 for controlling the flow of coolant supplied to the cooling fluid passage 312. The flow control device may include any suitable flow control device including, but not limited to, a pump, a valve, and combinations thereof. The flow control device 402 is coupled in fluid communication with the coolant inlet passage 212 and the coolant outlet passage 214, for example, directly or indirectly via one or more fluid conduits. In the embodiment illustrated in FIG. 20, the flow control device 402 is coupled in line with both the coolant inlet passage 212 and the coolant outlet passage 214. In other embodiments, the flow control device 402 may be coupled in line with one of the coolant inlet passage 212 and the coolant outlet passage 214. In such embodiments, the other of the coolant inlet passage 212 and the coolant outlet passage 214 may be connected, for example, to a supply of coolant fluid or to a coolant fluid return line.

Figure 17:
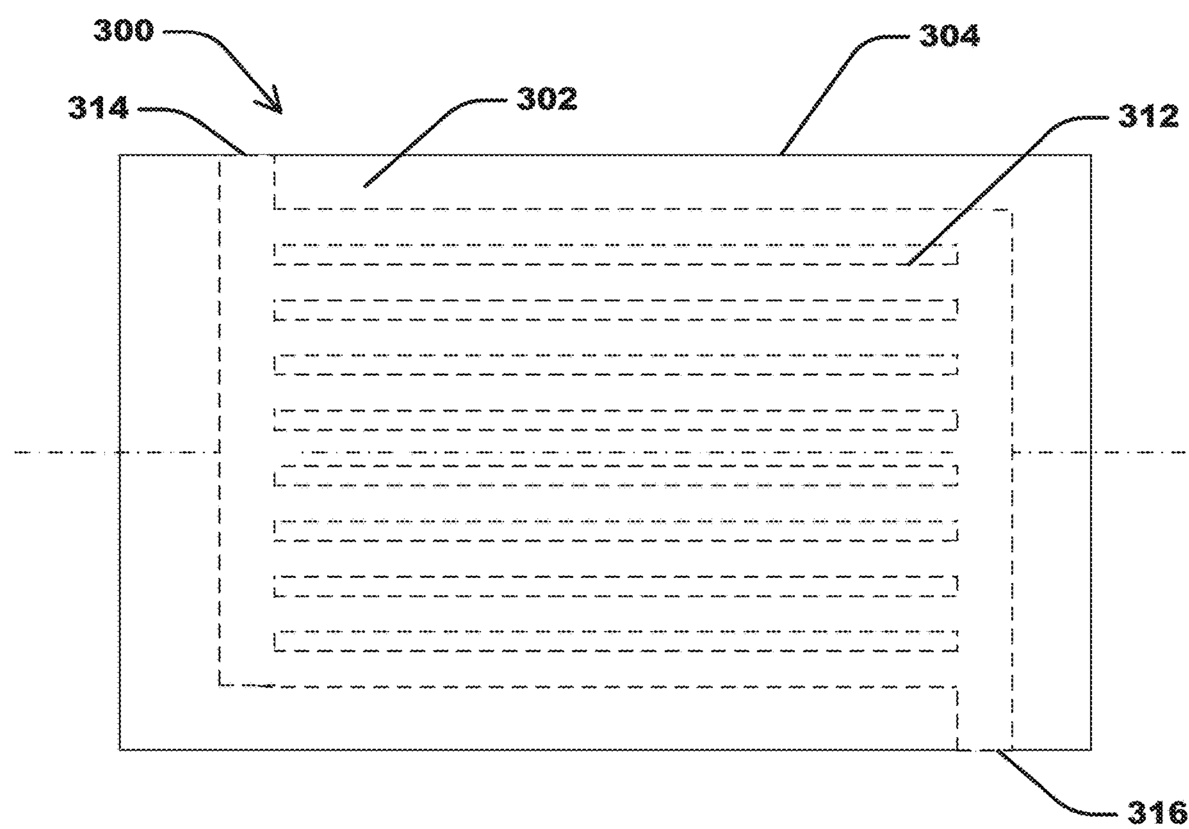
FIG. 17 is a side view of the foil bearing assembly shown in FIG. 7 with a cooling conduit formed as a plurality of parallel axial conduits.

In some aspects, the flow control device 402 includes at least one valve to control the rate of flow through the cooling fluid passage 312. Suitable valves include, but are not limited to, a variable orifice or diameter valve, such as a servo valve, and a fixed orifice or diameter valve, such as a solenoid valve and a pulse-width-modulated (PWM) valve. In one aspect, the at least one valve is configured to enable the stop or start of coolant flow through the cooling fluid passage by manually or automatically opening or closing the one or more valves. In another aspect, the at least one valve is configured to control the distribution of flow within the cooling fluid passage 312 by partially or fully opening or closing the one or more valves. By way of non-limiting example, if the cooling fluid passage 312 is arranged in a manifold pattern as illustrated in FIG. 17, individual valves positioned within the cooling fluid passage 312 may stop flow to selected portions of the individual conduits to reduce local cooling in the regions adjacent to the selected conduit portions. In an additional aspect, the at least one valve is a PWM valve configured to control flow according to a duty cycle.

In an additional aspect, the flow control device 402 is a pump. In this additional aspect, coolant flow is controlled by increasing or decreasing the pump speed or by modulating a pump duty cycle.

In another aspect, the flow control device 402 is operatively coupled to a controller 404 configured to control at least one operating parameter of the flow control device 402 according to one or more control schemes as described in detail below. In this aspect, the controller 404 controls coolant flow through the foil bearing assembly 300 according to one or more control schemes based on measurements or other data received from one or more sensors 406 and 408 configured to monitor one or more states of the compressor system 100. Non-limiting examples of suitable sensors for use in the one or more control schemes include temperature sensors, pressure sensors, flow sensors, current sensors, voltage sensors, rotational rate sensors, and any other suitable sensors.

In one aspect, coolant flow may be controlled by increasing or decreasing the coolant pressure entering the foil bearing assembly 300. In another aspect, coolant flow may be controlled by partially or completely opening or closing a valve. In an additional aspect, the coolant flow may be controlled using a pulse-width-modulation (PWM) scheme to open and close coolant flow based on a duty cycle.

In one aspect, the coolant flow through the cooling fluid passage of the foil bearing assembly 300 is maintained in an open state ("coolant always on"). In this control scheme, the flow control device 402 and/or the controller 404 are operated such that coolant flows through the cooling fluid passage at all times during the operation of the compressor system 100. In another aspect, the coolant flow through the foil bearing assembly 300 is manually increased or reduced prior to operation of the system 100 such that coolant flow is still maintained at a constant rate throughout operation of the compressor system 100, but the coolant flow may be manually controlled according to need, including but not limited to, adjusting coolant flow in response to changes in the temperature or other conditions in the environment surrounding the compressor system 100.

In various other aspects, the flow of coolant is controlled in response to a detected state of the compressor system 100. In these various other aspects, the compressor system 100 includes at least one flow control device 402 controlled by the controller 404 for modulating the flow of coolant through the foil bearing assembly 300. In some aspects, the flow of coolant is controlled by operating the at least one flow control device 402 according to one or more feedback control schemes ("on demand coolant") based on a detected state of the compressor system 100. In some aspects, any feedback or closed loop control scheme may be used to enable the modulation of the coolant flow through the cooling fluid passage including, but not limited to, PID controllers, PI controllers, fuzzy logic controllers, and any other suitable control schemes that may be used to modulate coolant flow through the foil bearing assembly 300.

In one aspect, the detected states of the system 100 used to modulate the coolant flow are directly sensed. In this aspect, at least one bearing temperature sensor 406 is positioned inside the compressor housing in close proximity to the at least one foil bearing assembly 300 to directly sense the bearing temperature of the at least one foil bearing within the foil bearing assembly 300. In this control scheme, coolant flow is increased in response to detected increases in bearing temperature to levels above a threshold temperature.

In another aspect, the detected states of the system 100 used to modulate the coolant flow are inferred based on sensors that monitor another state of the compressor system 100. In this aspect, at least one compressor temperature sensor 408 that senses a compressor temperature different from the bearing temperature is monitored to indirectly estimate a bearing temperature. The estimated bearing temperature is then used to control the coolant flow (e.g., via the flow control device 402). In this other aspect, a correlation between a compressor temperature detected elsewhere in the compressor system 100 and the bearing temperature is empirically derived based on characterization testing performed in a laboratory setting. Non-limiting examples of monitored temperatures suitable for estimation of bearing temperature by correlation include return gas temperature, casing temperature, and any other suitable monitored temperature. In this control scheme, coolant flow is increased in response to increases in estimated bearing temperature to levels above a threshold temperature.

In an additional aspect, the coolant flow is controlled based on one or more operating conditions of the compressor system 100. In this additional aspect, one or more sensors or controls are monitored to assess where the compressor system 100 is operating on an operating map, and coolant flow is controlled according to a predetermined schedule (e.g., based on previous knowledge of what regions of the operating map require increased or decreased bearing cooling). In another aspect, the controller 404 is configured to control the motor 108 of the compressor system 100 according to a predetermined operating map, and the coolant flow is controlled based on the operating map.

In some embodiments, compressor system 100 may also include a user interface 410 configured to output (e.g., display) and/or receive information (e.g., from a user) associated with the compressor system 100. In some embodiments, the user interface 410 is configured to receive an activation and/or deactivation inputs from a user to activate and deactivate (i.e., turn on and off) or otherwise enable operation of the compressor system 100. Moreover, in some embodiments, user interface 410 is configured to output information associated with one or more operational characteristics of the compressor system 100, including, for example and without limitation, warning indicators, a status of the foil bearing assembly 300, and any other suitable information.

The user interface 410 may include any suitable input devices and output devices that enable the user interface 410 to function as described herein. For example, the user interface 410 may include input devices including, but not limited to, a keyboard, mouse, touchscreen, joystick(s), throttle(s), buttons, switches, and/or other input devices. Moreover, the user interface 410 may include output devices including, for example and without limitation, a display (e.g., a liquid crystal display (LCD), or an organic light emitting diode (OLED) display), speakers, indicator lights, instruments, and/or other output devices.

In yet other embodiments, the compressor system 100 may be controlled by a remote control interface. In some embodiments, for example, the compressor system 100 includes a communication interface configured for connection to a wireless control interface that enables remote control and activation of the compressor system 100. The wireless control interface may be embodied on a portable computing device, such as a tablet or smartphone.

The controller 404 is generally configured to control operation of the compressor system 100. In some embodiments, for example, the controller 404 receives user input from the user interface 410, and controls one or more components of the compressor system 100 in response to such user inputs. In some embodiments, for example, the controller 404 controls power supply to the motor 108 based on user input received from the user interface 410. Moreover, in some embodiments, the controller 404 may regulate or control electrical power supplied to the compressor system 100, such as from an energy storage device. For example, the controller 404 may include one or more power converters or regulators configured to control or regulate the electrical power supplied to components of the compressor system 100, such as the motor 108. In some embodiments, for example, the controller 404 may include one or more DC power converters or regulators configured to control or regulate DC power supplied by the energy storage device. Such power converters and regulators may be incorporated or integrated within components of the compressor system 100.

The controller 404 may generally include any suitable computer and/or other processing unit, including any suitable combination of computers, processing units and/or the like that may be communicatively coupled to one another and that may be operated independently or in connection within one another (e.g., controller 404 may form all or part of a controller network). Controller 404 may include one or more modules or devices, one or more of which is enclosed within compressor system 100, or may be located remote from compressor system 100. The controller 404 may include one or more processor(s) 412 and associated memory device(s) 414 configured to perform a variety of computer-implemented functions (e.g., performing the calculations, determinations, and functions disclosed herein). As used herein, the term "processor" refers not only to integrated circuits, but also refers to a controller, a microcontroller, a microcomputer, a programmable logic controller (PLC), an application specific integrated circuit, and other programmable circuits. Additionally, memory device(s) 414 of controller 404 may generally be or include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 414 may generally be configured to store suitable computer-readable instructions that, when implemented by the processor(s), configure or cause controller 404 to perform various functions described herein including, but not limited to, controlling the compressor system 100, controlling operation of the motor 108, receiving inputs from user interface 410, providing output to an operator via user interface 410, controlling the flow control device 402 and/or various other suitable computer-implemented functions.

Controller 404 and/or components of controller 404 may be integrated or incorporated within other components of compressor system 100. In some embodiments, for example, controller 404 may be incorporated within motor 108 or flow control device 402.

Embodiments of the systems and methods described herein provide improved performance as compared to at least some prior systems and methods. For example, unlike known bearing systems that include at least one foil bearing assembly, the interchangeable foil bearing assemblies simplify the design of centrifugal compressor systems with different capacities. A variety of different motors and driveshafts may be accommodated within a single compressor housing size by exchanging a first foil bearing assembly with a second foil bearing assembly without need for further modification. In addition, the cooling fluid passage within the foil bearing assembly provides varying degrees of conductive cooling enhancement to further enable a wide variety of compressor system configurations within a common compressor housing. The enhanced bearing cooling enabled by the foil bearing assembly additionally mitigates excessive bearing wear and the risk of bearing failure due to thermal runaway and other thermal effects.

Example embodiments of foil bearing assemblies, compressor systems, and methods, such as compressor systems that incorporate the disclosed foil bearing assembly and methods of assembling compressor systems that include the disclosed foil bearing assembly, are described above in detail. The systems and methods are not limited to the specific embodiments described herein, but rather, components of the system and methods may be used independently and separately from other components described herein. For example, the bearing housing described herein may be used in compressors other than refrigerant compressors, such as turbocharger compressors and the like.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawings shall be interpreted as illustrative and not in a limiting sense.

What is claimed is:

1. A compressor system comprising:

a compressor housing;

a motor driveshaft rotatably supported within the compressor housing;

an impeller connected to the driveshaft and operable to compress incoming refrigerant gas upon rotation of the driveshaft;

a bearing housing mounted to the compressor housing and defining a coolant inlet passage and a coolant outlet passage; and first and second foil bearing assemblies, each of the first and second foil bearing assemblies comprising:

a cylindrical body having an outer surface including a pair of opposed end surfaces and a radial outer surface defining an outer diameter of the cylindrical body, the cylindrical body further having a radial inner surface defining an inner diameter of the cylindrical body, the cylindrical body defining a cooling fluid passage between the radial outer surface and the radial inner surface, wherein the cooling fluid passage extends from an intake port defined in the outer surface to an outlet port defined in the outer surface; and a foil bearing retained within the cylindrical body and in thermal communication with the radial inner surface of the cylindrical body for conductive heat transfer therebetween;

wherein each of the first and second foil bearing assemblies is connectable to the bearing housing such that the intake and outlet ports are connected in fluid communication with the coolant inlet passage and coolant outlet passage defined by the bearing housing; and wherein the first foil bearing assembly is interchangeable with the second foil bearing assembly.

2. The compressor system of claim 1, wherein at least one of a coolant circulation pattern of the cooling fluid passage of the second foil bearing assembly, the foil bearing of the second foil bearing assembly, the inner diameter of the second foil bearing assembly, a material of the cylindrical body of the second foil bearing assembly, and a material of the foil bearing of the second foil bearing assembly is different than the coolant circulation pattern of the cooling fluid passage of the first foil bearing assembly, the foil bearing of the first foil bearing assembly, the inner diameter of the first foil bearing assembly, a corresponding material of the cylindrical body of the first foil bearing assembly, and a corresponding material of the foil bearing of the first foil bearing assembly.

3. The compressor system of claim 1, wherein:

the cylindrical bodies of the first and second foil bearing assemblies have the same outer diameter; and the intake and outlet ports of the cylindrical body of the first foil bearing assembly have the same axial and angular location as the corresponding intake and outlet ports of the cylindrical body of the second foil bearing assembly.

4. The compressor system of claim 1, wherein the cylindrical body of each of the first and second foil bearing assemblies includes a common keyed feature shaped to cooperatively engage a complementary keyed feature of the bearing housing to orient the first and second foil bearing assemblies at the same orientation when connected to the bearing housing.

5. The compressor system of claim 1, wherein the cylindrical body of the first foil bearing assembly includes a first groove and a second groove defined in the outer surface, wherein the intake port is positioned within the first groove and the outlet port is positioned within the second groove.

6. The compressor system of claim 5, wherein at least one of the first and second grooves is a circumferential groove that extends circumferentially around the radial outer surface of the cylindrical body of the first foil bearing assembly.

7. The compressor system of claim 5, wherein at least one of the first and second grooves is an arcuate groove defined in one of the pair of opposed end surfaces of the cylindrical body of the first foil bearing assembly.

8. The compressor system of claim 1 further comprising an annular spacer positionable axially between a portion of the bearing housing and at least one of the cylindrical bodies of the first and second foil bearing assemblies.

9. The compressor system of claim 8, wherein the spacer has a cooling fluid passage defined therein to provide fluid communication between the cooling fluid passage of the first foil bearing assembly and at least one of the coolant inlet passage and the coolant outlet passage of the bearing housing.

10. The compressor system of claim 1, further comprising:

a flow control device coupled in fluid communication with the coolant inlet passage and the coolant outlet passage and operable to control flow of coolant through the coolant inlet passage and the coolant outlet passage according to at least one operating parameter; and a controller connected to the flow control device and operable to control the at least one operating parameter of the flow control device.

11. The compressor system of claim 10, wherein the flow control device comprises one or more of a pump and a valve.

12. The compressor system of claim 11, wherein the flow control device is a pulse-width-modulated (PWM) valve and the at least one operating parameter is a valve duty cycle.

13. The compressor system of claim 10, further comprising a bearing temperature sensor in thermal communication with the foil bearing and operatively coupled with the controller, the bearing temperature sensor operable to monitor a foil temperature, wherein the controller is configured to control the at least one operating parameter of the flow control device based on the foil temperature.

14. The compressor system of claim 10, further comprising a compressor temperature sensor in thermal communication with a region of the compressor and operatively coupled with the controller, the compressor temperature sensor operable to monitor a compressor temperature, wherein the controller is configured to estimate a bearing temperature based on the compressor temperature and to control the at least one operating parameter of the flow control device based on the estimated bearing temperature.

15. The compressor system of claim 10, wherein:

the controller is further operable to control the motor according to a predetermined operating map; and the controller is further operable to control the at least one operating parameter of the flow control device based on the predetermined operating map.

16. The compressor system of claim 1, wherein the first and second foil bearing assemblies are removably connected to the bearing housing.

17. A foil bearing assembly comprising:

a cylindrical body having an outer surface including a pair of opposed end surfaces and a radial outer surface defining an outer diameter of the cylindrical body, the cylindrical body further having a radial inner surface defining an inner diameter of the cylindrical body, the cylindrical body defining a cooling fluid passage between the radial outer surface and the radial inner surface, wherein the cooling fluid passage extends from an intake port defined in the outer surface to an outlet port defined in the outer surface; and a foil bearing retained within the cylindrical body and in thermal communication with the radial inner surface of the cylindrical body for conductive heat transfer therebetween;

wherein the foil bearing assembly is connectable to a bearing housing such that the intake and outlet ports are connected in fluid communication with a coolant inlet passage and a coolant outlet passage defined by the bearing housing; and wherein the foil bearing assembly is a first foil bearing assembly, and wherein the first foil bearing assembly is interchangeable with a second foil bearing assembly having at least one of a cooling fluid passage, a foil bearing, and a cylindrical body inner diameter different than the corresponding cooling fluid passage, the foil bearing, and the cylindrical body inner diameter of the first foil bearing assembly.

18. The foil bearing assembly of claim 17, wherein the second foil bearing assembly includes a cylindrical body having an outer diameter and an inner diameter, and wherein the cylindrical bodies of the first and second foil bearing assemblies have the same outer diameter.

19. A method of assembling a compressor system, the compressor system including a compressor housing, a bearing housing connected to the compressor housing, and a driveshaft supported by the bearing housing the method comprising:

selecting a first foil bearing assembly from a plurality of foil bearing assemblies for connection to the bearing housing, each of the plurality of foil bearing assemblies including:

a cylindrical body having an outer surface including a pair of opposed end surfaces and a radial outer surface defining an outer diameter of the cylindrical body, the cylindrical body further having a radial inner surface defining an inner diameter of the cylindrical body, wherein the cylindrical body defines a cooling fluid passage between the radial outer surface and the radial inner surface, wherein the cooling fluid passage extends from an intake port defined in the outer surface to an outlet port defined in the outer surface; and a foil bearing retained within the cylindrical body and in thermal communication with the radial inner surface of the cylindrical body for conductive heat transfer therebetween;

selecting a second foil bearing assembly from the plurality of foil bearing assemblies, wherein the first foil bearing assembly is interchangeable with the second foil bearinq assembly having at least one of the cooling fluid passage, the foil bearinq, and the cylindrical body inner diameter different than the corresponding cooling fluid passage, the foil bearing, and the cylindrical body inner diameter of the first foil bearing assembly;

wherein selecting the first foil bearing assembly from the plurality of foil bearing assemblies includes selecting the first foil bearing assembly based on at least one of a cooling capacity of the compressor, a driveshaft diameter, a driveshaft weight, a driveshaft operating speed, a driveshaft material, and a type of refrigerant used in the compressor; and connecting the first foil bearing assembly to the bearing housing such that the intake and outlet ports are connected in fluid communication with a coolant inlet passage and a coolant outlet passage defined by the bearing housing.

20. The method of claim 19, wherein selecting the first foil bearing assembly from the plurality of foil bearing assemblies includes selecting the first foil bearing assembly based on at least one of a coolant circulation pattern of the cooling fluid passage, a stiffness of the foil bearing, a load carrying capacity of the foil bearing, a foil bearing material, a cylindrical body material, the inner diameter of the first foil bearing assembly, and a surface coating applied to the foil bearing assembly.

* * * * *